(12) United States Patent
Bayesteh et al.

(10) Patent No.: US 10,448,368 B2
(45) Date of Patent: Oct. 15, 2019

(54) SYSTEMS AND METHODS FOR GRANT-FREE UPLINK TRANSMISSION

(71) Applicants: Alireza Bayesteh, Ottawa (CA); Jianglei Ma, Ottawa (CA); Ming Jia, Ottawa (CA)

(72) Inventors: Alireza Bayesteh, Ottawa (CA); Jianglei Ma, Ottawa (CA); Ming Jia, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 2 days.

(21) Appl. No.: 15/783,515

(22) Filed: Oct. 13, 2017

(65) Prior Publication Data

US 2018/0139727 A1 May 17, 2018

Related U.S. Application Data

(60) Provisional application No. 62/420,979, filed on Nov. 11, 2016.

(51) Int. Cl.
| | |
|---|---|
| *H04W 72/04* | (2009.01) |
| *H04W 72/12* | (2009.01) |
| *H04B 7/04* | (2017.01) |
| *H04L 1/18* | (2006.01) |
| *H04W 74/08* | (2009.01) |

(Continued)

(52) U.S. Cl.
CPC ............. *H04W 72/04* (2013.01); *H04B 7/04* (2013.01); *H04B 7/0689* (2013.01); *H04B 7/12* (2013.01); *H04L 1/1861* (2013.01); *H04W 72/1284* (2013.01); *H04W 74/08* (2013.01)

(58) Field of Classification Search
None
See application file for complete search history.

(56) References Cited

U.S. PATENT DOCUMENTS

| | | |
|---|---|---|
| 2014/0192767 A1 | 7/2014 | Au et al. |
| 2014/0254544 A1 | 9/2014 | Au et al. |
| 2016/0219627 A1 | 7/2016 | Au et al. |

(Continued)

FOREIGN PATENT DOCUMENTS

| | | |
|---|---|---|
| CN | 105284172 A | 1/2016 |

OTHER PUBLICATIONS

R1-1609499 Intel Corporation,"Grant-free UL transmissions in NR",3GPP TSG-RAN WG1 #86bis,Lisbon, Portugal, Oct. 10-14, 2016, total 8 pages.

*Primary Examiner* — Jutai Kao

(57) ABSTRACT

Communication resources for grant-free transmission are assigned to a User Equipment (UE) in a communication system. A diversity channel for uplink grant-free data transmission includes uplink grant free transmission resources assigned to the UE. The uplink grant-free transmission resources include one or more positions corresponding to partitions of an access region and one or more positions corresponding to resource elements (REs) in each partition of the access region. At a UE, an uplink initial data transmission and a subsequent transmission are transmitted by the UE in the diversity channel without receiving grant information from a network equipment. At a network equipment, the uplink initial data transmission and the subsequent transmission are received in the diversity channel without transmitting grant information to the UE.

21 Claims, 9 Drawing Sheets

(51) Int. Cl.
*H04B 7/06* (2006.01)
*H04B 7/12* (2006.01)

(56) References Cited

U.S. PATENT DOCUMENTS

2017/0171855 A1* 6/2017 Sundararajan ........ H04W 74/08
2017/0367110 A1* 12/2017 Li ........................ H04L 5/0007

* cited by examiner

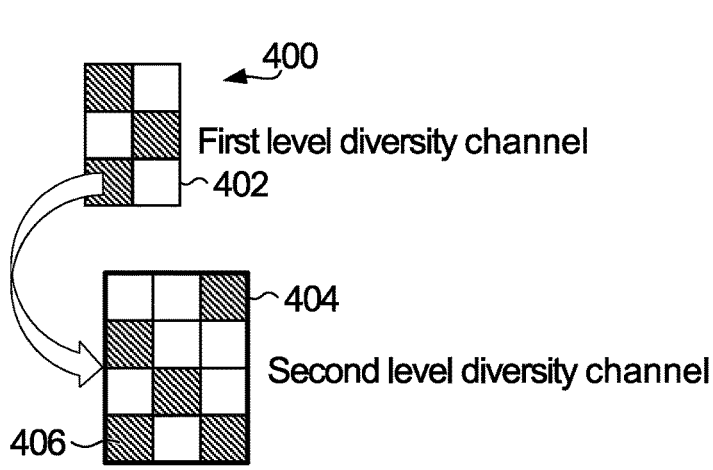
FIG. 4
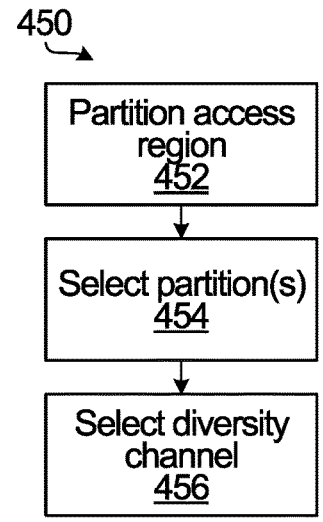
FIG. 4A
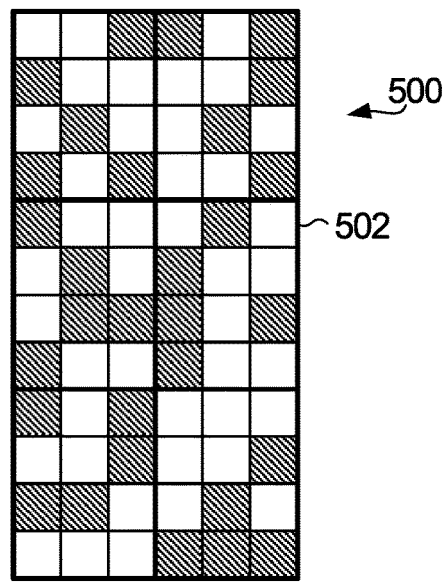
FIG. 5
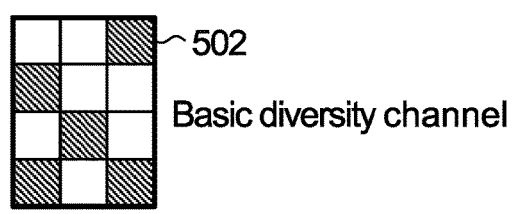

SYSTEMS AND METHODS FOR GRANT-FREE UPLINK TRANSMISSION

CROSS-REFERENCE TO RELATED APPLICATIONS

The present application claims the benefit of U.S. Provisional Application No. 62/420,979, filed on Nov. 11, 2016, entitled "SYSTEM AND METHOD FOR GRANT-FREE UPLINK TRANSMISSION", the entire contents of which are incorporated herein by reference.

FIELD

The present disclosure relates generally to wireless communications and, in particular, to grant-free uplink transmissions.

BACKGROUND

In some wireless communication systems, a user equipment (UE) wirelessly communicates with a base station to send data to the base station and/or receive data from the base station. A wireless communication from a UE to a base station is referred to as an uplink communication, and a wireless communication from a base station to a UE is referred to as a downlink communication.

Resources are required to perform uplink and downlink communications. For example, a UE may wirelessly transmit data to a base station in an uplink transmission at a particular frequency and/or during a particular slot in time. The frequency and time slot used are examples of resources.

In some wireless communication systems, if a UE is to transmit data to a base station, the UE requests uplink resources from the base station. The base station grants the uplink resources, and then the UE sends the uplink transmission using the granted uplink resources. An example of uplink resources that may be granted by the base station is a set of time/frequency locations in an uplink orthogonal frequency-division multiple access (OFDMA) frame.

The base station is aware of the identity of the UE sending the uplink transmission using the granted uplink resources, because the base station specifically granted those uplink resources to that UE. However, there may be schemes in which the base station does not know which UE, if any, is going to send an uplink transmission using certain uplink resources. An example is a grant-free uplink transmission scheme in which UEs may send uplink transmissions using certain uplink resources shared by the UEs, without specifically requesting use of the resources and without specifically being granted the resources by the base station. The base station will therefore not know which UE, if any, is going to send a grant-free uplink transmission using the resources. Also, assuming there is no coordination amongst the UEs, then two or more UEs may each send a respective grant-free uplink transmission using the same resources, causing a collision.

A Grant-Free (GF) transmission refers to a transmission in a communication system using communication resources for which an explicit grant of access to use those resources is not required. GF transmission is a promising technology that may enable services with very tight latency, such as ultra-Reliable Low Latency Communications (uRLLC), and may provide reduced scheduling overhead and energy savings for applications such as massive Machine-Type Communication (mMTC).

One important feature of GF transmission is that GF communication resources that are used for GF transmission are not scheduled by a communication network. UEs can transmit over GF communication resources without any grant from the network.

SUMMARY

A method for uplink data transmission involves obtaining, by a UE, at least one diversity channel for uplink grant free data transmission, and transmitting, by the UE, an uplink initial data transmission and a subsequent transmission in the at least one diversity channel without receiving grant information from a network equipment. The at least one diversity channel includes uplink grant free transmission resources assigned to the UE. The uplink grant free transmission resources include one or more positions corresponding to partitions of an access region and one or more positions corresponding to resource elements (REs) in each partition of the access region.

According to another method for uplink data transmission, a network equipment receives an uplink initial data transmission and a subsequent transmission from a first UE in a first diversity channel without transmitting grant information to the first UE. The first diversity channel includes uplink grant free transmission resources assigned to the UE, and the uplink grant free transmission resources include one or more positions corresponding to partitions of an access region and one or more positions corresponding to REs in each partition of the access region.

A UE according to an aspect of the present disclosure includes a resource manager to obtain at least one diversity channel for uplink grant free data transmission. The at least one diversity channel includes uplink grant free transmission resources assigned to the UE, and the uplink grant free transmission resources include one or more positions corresponding to partitions of an access region and one or more positions corresponding to REs in each partition of the access region. A transmitter is operatively coupled to the resource manager, to transmit an uplink initial data transmission and a subsequent transmission in the at least one diversity channel without receiving grant information from a network equipment.

A network equipment may include a transmitter and a receiver to receive an uplink initial data transmission and a subsequent transmission from a first UE in a first diversity channel without transmitting grant information to the first UE. The first diversity channel includes uplink grant free transmission resources assigned to the first UE, and the uplink grant free transmission resources include one or more positions corresponding to partitions of an access region and one or more positions corresponding to REs in each partition of the access region.

A non-transitory processor-readable medium may store instructions which, when executed by one or more processors, cause the one or more processors to perform a method for uplink data transmission. The method could involve obtaining, by a UE, at least one diversity channel for uplink grant free data transmission, and transmitting, by the UE, an uplink initial data transmission and a subsequent transmission in the at least one diversity channel without receiving grant information from a network equipment. The at least one diversity channel includes uplink grant free transmission resources assigned to the UE. The uplink grant free transmission resources include one or more positions corresponding to partitions of an access region and one or more positions corresponding to REs in each partition of the access region.

The method could also or instead involve a network equipment receiving an uplink initial data transmission and a subsequent transmission from a first UE in a first diversity channel without transmitting grant information to the first UE. The first diversity channel includes uplink grant free transmission resources assigned to the UE, and the uplink grant free transmission resources include one or more positions corresponding to partitions of an access region and one or more positions corresponding to REs in each partition of the access region.

The present disclosure also provides a UE that includes a processor configured to obtain at least one diversity channel for uplink grant free data transmission, and a transmitter, operatively coupled to the processor, to transmit an uplink initial data transmission and a subsequent transmission in the at least one diversity channel without receiving grant information from a network equipment. As above, the at least one diversity channel includes uplink grant free transmission resources assigned to the UE, and the uplink grant free transmission resources include one or more positions corresponding to partitions of an access region and one or more positions corresponding to REs in each partition of the access region.

According to another aspect of the present disclosure, a method includes: assigning a set of communication resources for grant-free transmission to a UE or group of UEs in a communication system; and assigning, to the UE or the UEs in the group of UEs, a set of diversity channels in the set of communication resources assigned for grant-free transmission.

In an embodiment, the method further includes: transmitting to each UE information from which the UE identifies its assigned set of diversity channels.

In an embodiment, the information from which the UE identifies its assigned set of diversity channels includes an explicit identification of its assigned set of diversity channels or an implicit identification of its assigned set of diversity channels.

Assigning a set of diversity channels could involve assigning one or more of the same diversity channels to each of multiple UEs.

In another embodiment, assigning a set of diversity channels involves assigning a respective UE-specific diversity channel to each UE.

According to another aspect, a method includes: selecting at a User Equipment (UE), from a set of communication resources in a communication system, a subset of the communication resources for a grant-free transmission by the UE; and transmitting data by grant-free transmission from the UE using the selected subset of the communication resources.

In an embodiment, the selecting involves selecting based on an identifier of the UE.

In an embodiment, the selecting involves selecting based on information received by the UE from network equipment in the communication system.

In an embodiment, the set of communication resources assigned for use by UEs in grant-free transmissions includes N Resource Elements (REs), and the selecting involves selecting a diversity channel f(m,N), where f is a mapping and m is a number of REs in the diversity channel.

In an embodiment, the set of communication resources assigned for use by UEs in grant-free transmissions includes REs assigned to an access region that is partitioned into a plurality of partitions, and the selecting involves selecting a two-level diversity channel defined by functions f1 and f2: f1(m1,N1), where m1 is the number of partitions assigned for the diversity channel and N1 is the total number of partitions in the access region; f2(m2,N2), where m2 is the number of REs that are assigned for the UE and N2 is the total number of REs in each partition.

In an embodiment, the set of communication resources assigned for use by UEs in grant-free transmissions includes REs assigned to an access region that is partitioned into a plurality of partitions, and the selecting involves defining L different diversity channels for each of the partitions and defining a hopping pattern from each partition to another partition.

In an embodiment, the selecting involves selecting the subset of the communication resources from a look up table.

In an embodiment, the method also involves: selecting a further subset of the communication resources for a grant-free retransmission of the data; and retransmitting the data by grant-free transmission from the UE using the selected further subset of the communication resources.

According to another aspect, a method involves: transmitting data by grant-free transmission from User Equipment (UE) using a subset of communication resources in a communication system; selecting a further subset of the communication resources for a grant-free retransmission of the data; and retransmitting the data by grant-free transmission from the UE using the selected further subset of the communication resources.

In an embodiment, selecting a further subset of the communication resources and retransmitting the data are responsive to receipt of a negative acknowledgement from a receiver to which the data was transmitted.

In an embodiment, both the subset and the further subset of the communication resources are selected before the transmitting.

In an embodiment, such a method also includes other features recited above for the subset, but in respect of the further subset of the communication resources.

According to a further aspect, a method for uplink transmission involves: receiving, by a network entity, a first uplink grant-free transmission from a first user equipment (UE) in a first diversity channel of an access region; receiving, by the network entity, a second uplink grant-free transmission from a second UE in a second diversity channel of the access region, wherein the first diversity channel and the second diversity channel comprise at least one resource element (RE) and partly overlap in the access region.

In some embodiments, the method further includes, before the receiving, assigning, by the network entity, the access region for a group of UEs at least comprising the first UE and the second UE.

In some embodiments, the method further involves: assigning, by the network entity, the first diversity channel for the first UE; assigning, by the network entity, the second diversity channel for the second UE.

In some embodiments, one RE in the first diversity channel comprises at least one RE selected for the first uplink grant-free transmission by selecting a partition from a plurality of partitions of the access region and then selecting the at least one RE from the selected partition.

In some embodiments, the method further involves: transmitting, by the network entity, information to the first UE, wherein the information is used to indicate the first diversity channel allocated to the first UE.

In some embodiments, the information comprises an explicit identification of the first diversity channel or an implicit identification of the first diversity channel.

In some embodiments, the access region comprises at least a first level of diversity channel partition, one RE in the first level of diversity channel partition comprises at least one second level of diversity channel partition.

According to a further aspect, a method involves: obtaining, by a user equipment (UE), a first diversity channel of an access region, wherein the access region includes multiple diversity channels for a group of UEs, and the first diversity channel comprises at least one resource element (RE) and partly overlaps with a second diversity channel; and transmitting, by the UE, an uplink grant-free transmission in the first diversity channel without receiving grant information.

In some embodiments, the obtaining comprises obtaining the first diversity channel based on an identifier of the UE.

In some embodiments, the obtaining comprises obtaining the first diversity channel based on information received by the UE from network equipment.

In some embodiments, the access region comprises N Resource Elements (REs), and wherein the obtaining comprises obtaining a diversity channel f(m,N) as the first diversity channel, where f is a mapping and m is a number of REs in the diversity channel.

In some embodiments, the access region is partitioned into a plurality of partitions, and wherein the obtaining comprises obtaining as the first diversity channel a two-level diversity channel defined by functions f1 and f2: f1(m1, N1), where m1 is the number of partitions assigned for the diversity channel and N1 is the total number of partitions in the access region; f2(m2,N2), where m2 is the number of REs that are assigned for the UE and N2 is the total number of REs in each partition.

In some embodiments, the access region is partitioned into a plurality of partitions, and wherein the obtaining comprises defining the first diversity channel as L different diversity channels for each of the partitions and a hopping pattern from each partition to another partition.

In some embodiments, the obtaining comprises obtaining the first diversity channel from a look up table.

In some embodiments, the method further involves: obtaining a further diversity channel; and transmitting, by the UE, an uplink grant-free retransmission in the further diversity channel without receiving grant information.

In some embodiments, the access region comprises at least a first level of diversity channel partition, one RE in the first level of diversity channel partition comprises at least one second level of diversity channel partition.

According to a further aspect, a method involves: transmitting, by a user equipment (UE), an uplink grant-free transmission in a first diversity channel of an access region without receiving grant information, wherein the access region includes multiple diversity channels for a group of UEs, and the first diversity channel comprises at least one resource element (RE) and partly overlaps with a second diversity channel; obtaining a further diversity channel; and transmitting, by the UE, an uplink grant-free retransmission in the further diversity channel without receiving grant information.

In some embodiments, the obtaining and transmitting the uplink grant-free retransmission are responsive to receipt of a negative acknowledgement from a receiver to which the grant-free transmission was transmitted.

In some embodiments, both the first diversity channel and the further diversity channel are obtained before transmitting the uplink grant-free transmission.

In some embodiments, other features disclosed herein apply in respect of the further diversity channel.

According to another aspect, a non-transitory processor-readable medium stores instructions, when executed by one or more processors, cause the one or more processors to perform a method as disclosed herein.

Another aspect relates to an apparatus that includes: a transmitter; and a resource manager, operatively coupled to the transmitter, to assign a set of communication resources for grant-free transmission to a UE or group of UEs in a communication system, and assign, to the UE or the UEs in the group of UEs, a set of diversity channels in the set of communication resources assigned for grant-free transmission.

In some embodiments, the resource manager is configured to implement other features described herein.

According to another aspect, an apparatus includes: a receiver to receive, at a network entity, a first uplink grant-free transmission from a first user equipment (UE) in a first diversity channel of an access region, and a second uplink grant-free transmission from a second UE in a second diversity channel of the access region, wherein the first diversity channel and the second diversity channel comprise at least one resource element (RE) and partly overlap in the access region.

In some embodiments, the apparatus is configured to implement other features disclosed herein.

A UE according to a further aspect includes: a resource manager to select, from a set of communication resources in a communication system, a subset of the communication resources for a grant-free transmission by the UE; and a transmitter, operatively coupled to the resource manager, to transmit data by grant-free transmission from the UE using the selected subset of the communication resources.

According to a further aspect, a UE includes: a resource manager to obtain a first diversity channel of an access region, wherein the access region includes multiple diversity channels for a group of UEs, and the first diversity channel comprises at least one resource element (RE) and partly overlaps with a second diversity channel; and a transmitter, operatively coupled to the resource manager, to transmit an uplink grant-free transmission in the first diversity channel without receiving grant information.

In some embodiments, one or more of the resource manager, the transmitter, and a receiver coupled to the resource manager of a UE is configured to implement other features disclosed herein.

Other aspects and features of embodiments of the present disclosure will become apparent to those ordinarily skilled in the art upon review of the following description.

BRIEF DESCRIPTION OF THE DRAWINGS

Embodiments of the invention will be described in greater detail with reference to the accompanying drawings.

FIG. 4 is a block diagram illustrating an example of a multi-level diversity channel.

FIG. 4A is a flow diagram illustrating an example method of obtaining a multi-level diversity channel.

FIG. 5 is a block diagram illustrating an example of a partition and hopping-based diversity channel.

DETAILED DESCRIPTION

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Turning now to the figures, some specific example embodiments will be described.

Figure 1A:
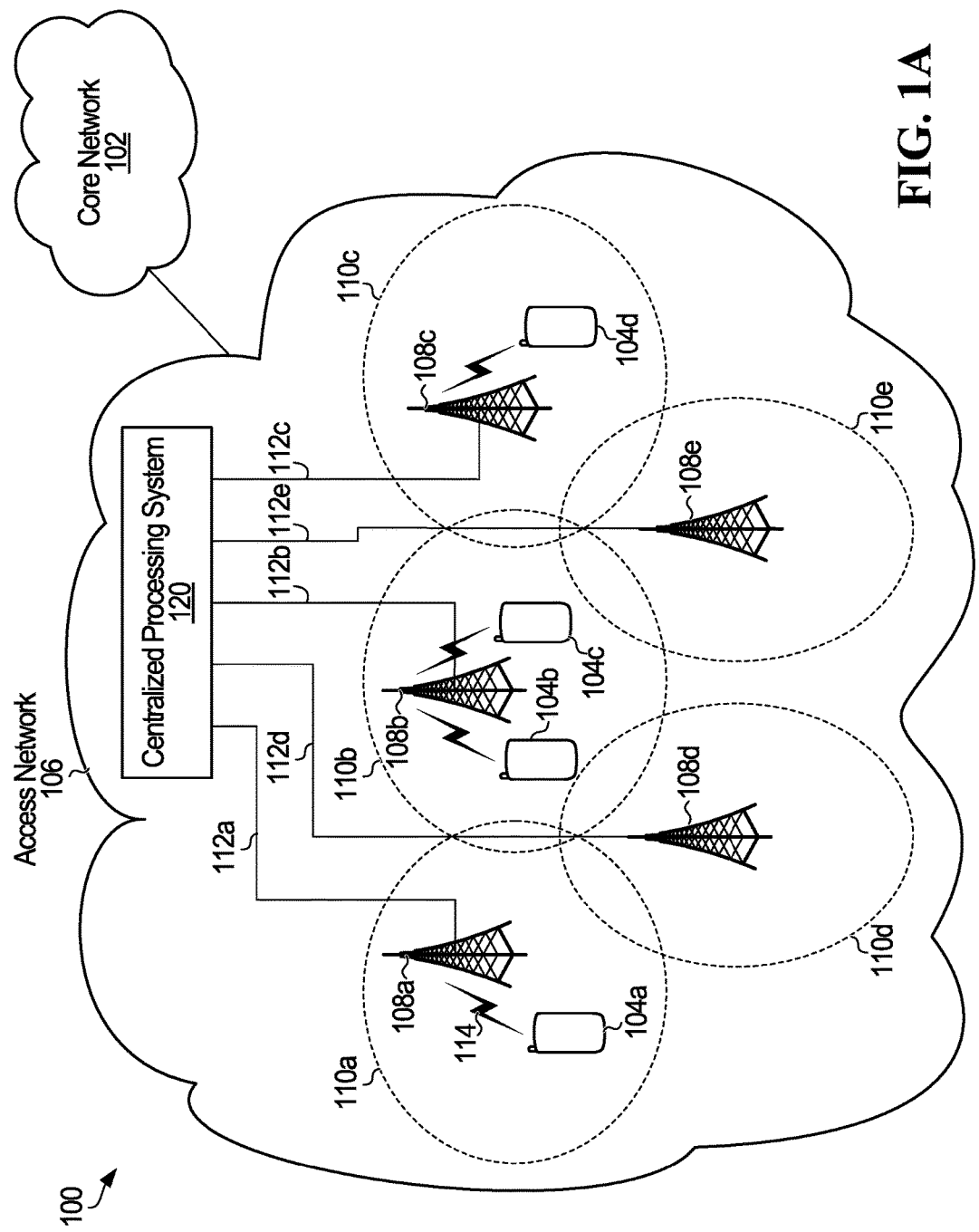
FIG. 1A is a block diagram illustrating a communication system.

FIG. 1A is a diagram illustrating a communication system. The communication system 100 includes a core network 102 and an access network 106.

The core network 102 may provide any of various services, such as call control/switching and gateways to other networks. The core network 102 includes network components such as routers, switches, and servers.

The access network 106 is a wireless communication network, and is connected or coupled to the core network 102. The network elements or nodes 108a, 108b, 108c, 108d, 108e provide wireless communication service within respective wireless coverage areas 110a, 110b, 110c, 110d, 110e. Each network element 108a-e may be implemented using a radio transceiver, one or more antennas, and associated processing circuitry, such as antenna radio frequency (RF) circuitry, analog-to-digital/digital-to-analog converters, etc. Base stations are an example of the network elements 108a-e. The phrase "base station" encompasses any device that wirelessly receives data in the uplink from UEs. Therefore, in some implementations, the base stations 108a-e may be called other names, such as a transmit and receive point (TRP), a base transceiver station, a radio base station, a network node, a transmit/receive node, a Node B, an eNode B, a relay station, or a remote radio head. Also, in some embodiments, the parts of the base stations 108a-e may be distributed. For example, some of the modules of the base stations 108a-e may be located remote from the equipment housing the antennas of the base station s108a-e, and may be coupled to the equipment housing the antennas over a communication link (not shown).

UEs 104a, 104b, 104c, 104d wirelessly access the communication system 100 using the access network 106. A UE represents any suitable end user device and may include such devices (or may be referred to) as a user equipment/device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device.

Each UE 104a-d includes a radio transmitter and a radio receiver which may be integrated into a radio transceiver, one or more antennas, and associated processing circuitry, such as antenna radio frequency (RF) circuitry, analog-to-digital/digital-to-analog converters, etc. The network elements 108-e and the UEs 104a-d may include similar types of components to support communications with each other in the communication system 100, but may also include other components as well.

The network elements 108a-e are connected to a centralized processing system 120 in the access network 106, via respective communication links 112a, 112b, 112c, 112d, 112e. Each communication link 112a-e is an optical fibre communication link in one embodiment. Each network element 108a-e includes circuitry for transmitting data to the centralized processing system 120 and for receiving data from the centralized processing system via its respective communication link 112a-e. Although shown as a single centralized processing system in FIG. 1, the centralized processing system 120 may be implemented by a network of one or more processing and control servers. Alternatively, the centralized processing system 120 may be implemented as a single server.

The network elements 108a-e may serve as a gateway between wireline and wireless portions of the access network 106, although this need not be the case in embodiments in which the communication links 112a-e are wireless links. The network elements 108a-e may be placed at fixed locations by a network provider, for example, to provide a substantially continuous wireless coverage area. This is shown in FIG. 1A in that wireless coverage areas 110a-e overlap each other so that the UEs 104a-d may move throughout the wireless coverage areas and still be served by the access network 106.

Figure 1B:
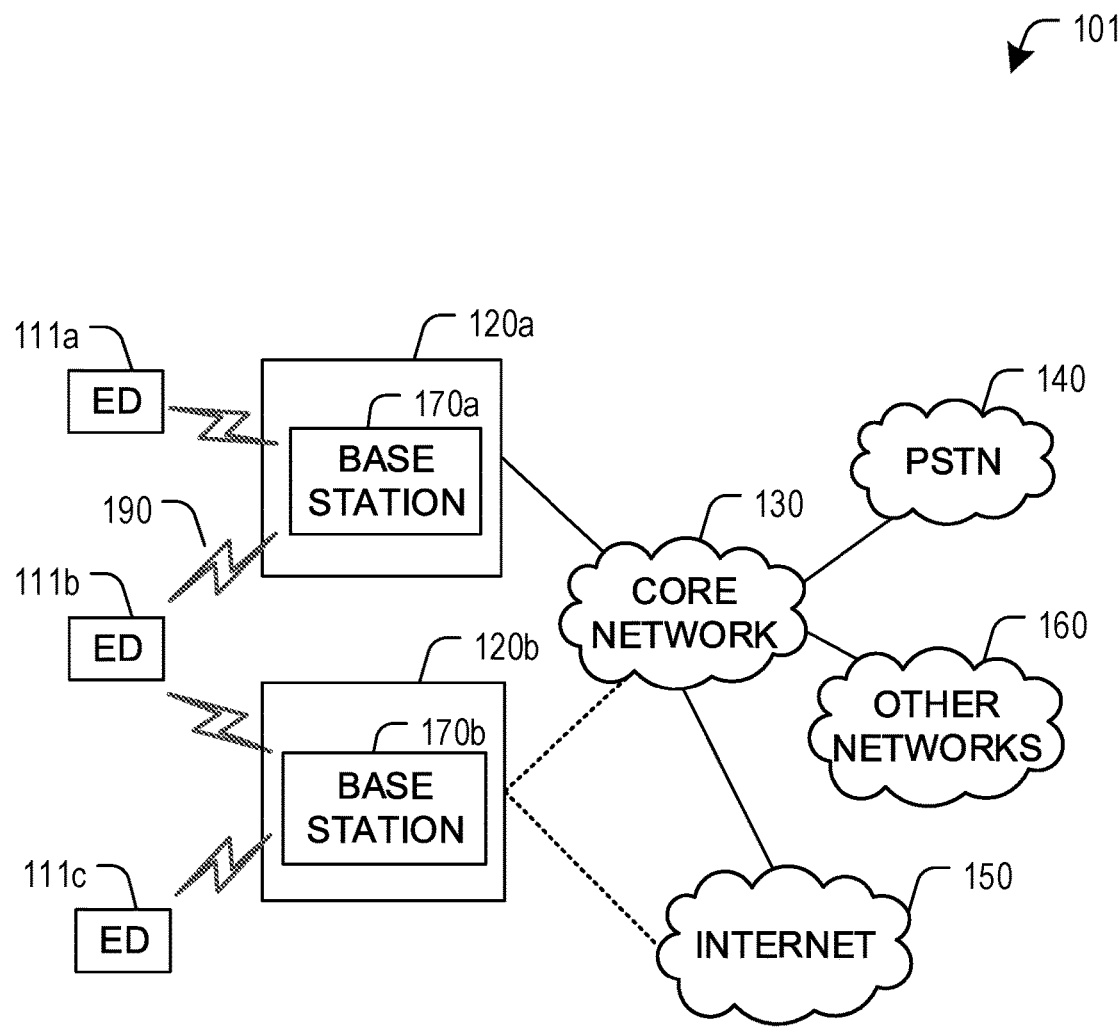
FIG. 1B is a network diagram of another example communication system.

FIG. 1B is a network diagram of another example communication system 101 in which embodiments of the present disclosure could be implemented. In general, the communication system 101 enables multiple wireless or wired elements to communicate data and other content. The purpose of the communication system 101 may be to provide content (voice, data, video, text) via broadcast, narrowcast, user device to user device, etc. The communication system 101 may operate by sharing resources such as bandwidth.

In this example, the communication system 101 includes electronic devices (ED) 111a-111c, radio access networks (RANs) 121a-121b, a core network 130, a public switched telephone network (PSTN) 140, the internet 150, and other networks 160. Although certain numbers of these components or elements are shown in FIG. 1 B, any reasonable number of these components or elements may be included in the communication system 101.

The EDs 111a-111c are configured to operate, communicate, or both, in the communication system 101. For example, the EDs 111a-111c are configured to transmit, receive, or both via wireless or wired communication channels. Each ED 111a-111c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 1B, the RANs 121a-121b include base stations 170a-170b, respectively. Each base station 170a-170b is configured to wirelessly interface with one or more of the EDs 111a-111c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission point (TP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 101 may include RANs, such as RAN 121b, wherein the corresponding base station 170b accesses the core network 130 via the internet 150, as shown.

The EDs 111a-111c and base stations 170a-170b are examples of communication equipment that can be configured to implement some or all of the functionality and/or embodiments described herein. In the embodiment shown in FIG. 1B, the base station 170a forms part of the RAN 121a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 121b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 121a-121b shown is exemplary only. Any number of RAN may be contemplated when devising the communication system 101.

The base stations 170a-170b communicate with one or more of the EDs 111a-111c over one or more air interfaces 190 using wireless communication links e.g. radio frequency (RF), microwave, infrared (IR), etc. The air interfaces 190 may utilize any suitable radio access technology. For example, the communication system 101 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, and/or LTE-B. It is contemplated that the communication system 101 may use multiple channel access functionality, including such schemes as described above. Other radio technologies for implementing air interfaces include IEEE 802.11, 802.15, 802.16, CDMA2000, CDMA2000 1X, CDMA2000 EV-DO, IS-2000, IS-95, IS-856, GSM, EDGE, and GERAN. Of course, other multiple access schemes and wireless protocols may be utilized.

The RANs 121a-121b are in communication with the core network 130 to provide the EDs 111a-111c with various services such as voice, data, and other services. The RANs 121a-121b and/or the core network 130 may be in direct or indirect communication with one or more other RANs (not shown), which may or may not be directly served by core network 130, and may or may not employ the same radio access technology as RAN 121a, RAN 121b or both. The core network 130 may also serve as a gateway access between (i) the RANs 121a-121b or EDs 111a-111c or both, and (ii) other networks (such as the PSTN 140, the internet 150, and the other networks 160). In addition, some or all of the EDs 111a-111c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as IP, TCP, UDP. EDs 111a-111c may be multimode devices capable of operation according to multiple radio access technologies, and incorporate multiple transceivers necessary to support such.

In some types of communication systems, transmissions are grant-based. For example, in the communication system 100 in FIG. 1, communication resources could be scheduled by the network elements 108a-e and/or the centralized processing system 120, and the UEs 104a-d transmit communication traffic using communication resources only after receiving an explicit grant of access to use those resources from a network element. GF transmission is an alternative to grant-based transmission, and as noted above does not require an explicit grant of access to use communication resources. If a communication system such as 100, 101 supports GF uplink transmission, for example, then UEs may transmit data on GF communication resources without first requesting or receiving permission to use those resources.

Grant-free uplink transmissions are sometimes called "grant-less", "schedule free", or "schedule-less" transmissions. Grant-free uplink transmissions from different UEs may be transmitted using the same designated resources, in which case the grant-free uplink transmissions are contention-based transmissions, and a transmission from a UE does not need a dynamic and explicit scheduling grant, from an eNB for example. Grant-free uplink transmissions may be suitable for such purposes as transmitting bursty traffic with short packets from UEs to a base station, and/or for transmitting data to the base station in real-time or with low-latency. Examples of applications in which a grant-free uplink transmission scheme could be utilized include: massive machine type communication (m-MTC), ultra-reliable low latency communications (URLLC), smart electric meters, teleprotection in smart grids, and autonomous driving. However, grant-free uplink transmission schemes are not limited to these applications.

Aspects of the present disclosure relate to GF transmission and management of communication resources, including allocation of communication resources for GF transmissions, and selecting or otherwise obtaining communication resources by UEs for their GF transmissions. GF transmission is an active topic for standardization for the next generation of telecommunication technology. There are many proposals on resource configuration and assignment for GF. In general, obtaining GF resources for use by each user may impact the overall performance of GF transmission. Therefore, it may be desirable to implement efficient resource management for GF resources, in an effort to provide quality of service for users using GF transmission.

Regarding allocation or assignment of communication resources for UE GF transmissions, a component in a communication network, such as a network element and/or a centralized processing system as shown in FIG. 1A or a base station as shown in FIG. 1 B, assigns a set of communication resources for use by UEs in grant-free transmissions. This set of communication resources is also referred to herein as an access region. An access region could be assigned to a UE or a group of UEs, for example.

Information identifying the assigned set of GF communication resources is transmitted to the UEs, to enable each UE to select a respective subset of the communication resources for a grant-free transmission by each UE, which is also referred to herein as diversity channels. Any of various approaches could be used for selecting GF resources, and several examples are disclosed herein. Selecting or obtaining GF resources by a UE could involve selecting or obtaining GF resources for initial GF transmission of data or traffic, and/or for subsequent transmission(s) of such data or traffic. Subsequent transmissions could include either or both of repetition of data or traffic, which is without acknowledgements and negative acknowledgements (ACK/NACK less), and retransmission based on NACK.

Figure 2:
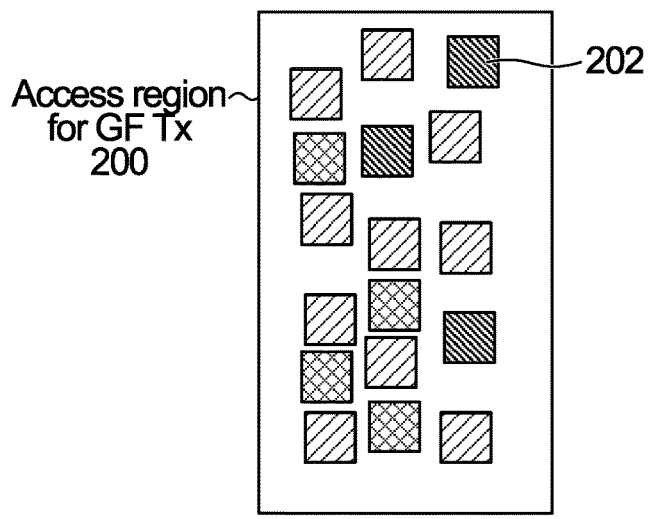
FIG. 2 is a block diagram illustrating an example of an access region and diversity channels.

GF transmission in uplink (UL) allows UEs to transmit in a pre-configured access region without requesting a grant from the network. FIG. 2 is a block diagram illustrating an example of an access region and diversity channels. The example access region 200 includes a set of communication resources 202, also referred to herein as Resource Elements (REs). An RE 202 represents a smallest frequency/time resource that can be used for GF transmission. In order to facilitate the GF transmission and reception, REs 202 are configured and assigned between UEs that may transmit in the access region 200. In an embodiment, communication resources such as the REs 202 are managed in a way to reduce collision probability between UEs that may transmit simultaneously, while providing a desired quality of service for those UEs.

Such resource management criteria could be taken into account not only in selection of REs 202 for use by each UE, but also or instead in selection of REs 202 for the access region 200 from REs that are available in a communication system. There may be other REs allocated to other communication system functions, such as grant-based communications for example, which are available in a communication system but are not allocated to an access region such as 200 for GF transmission. It should also be noted that there may be multiple access regions in a communication system, and those access regions may partially overlap, including some REs in common.

The assignment or allocation of REs 202 to an access region 200 could be static, semi-static, or dynamic. For example, RE allocation to GF transmission could change based on the amount of GF traffic that is being transmitted by UEs. A network element and/or other network equipment could monitor GF traffic and allocate more or fewer REs 202 to the access region 200 depending on the amount of GF traffic that is transmitted by UEs that use the access region REs for GF transmission. If the traffic load of GF applications (number of UEs using GF transmission or an input packet arrival rate of each GF UE, for example) increases or decreases, then the network could increase or decrease the size of (the number of REs 202 in) the access region 200 for GF. One or more GF traffic thresholds could be configured to trigger changes to RE allocation for GF transmission.

RE allocation to GF transmission could also or instead be based on other types of traffic currently being transmitted in a communication network. Traffic levels of other network traffic could be taken into account for initial assignment of REs 202 to access regions such as 200, and/or for semi-static or dynamic RE assignment. At busier times during which traffic levels of other network traffic is high, for example, the number of REs 202 allocated for GF transmission could be reduced. If the input traffic for other UEs transmitting in a grant-based fashion increases, for example, then the network could reduce the size of (the number of REs 202 in) the GF access region 200. Another possible option in this scenario is to also or instead allow partial or full overlap between REs for GF and grant-based transmissions, in which case at least some of the REs in the GF access region 200 are also available for grant-based transmission.

Other characteristics or parameters could also or instead impact RE assignment to access regions for GF transmission.

A UE selects a subset of the REs 202 that are assigned to the access region 200 to transmit data . Examples of subsets of the REs 202 are shown at 204, 206 for two UEs, UE1 and UE2. The selected REs are labeled as diversity channels in FIG. 2. A diversity channel is a subset of the REs 202 that are available for GF transmission. The granularity of resource assignment in FIG. 2 is RE-level, meaning that REs that are selected by a UE are discrete, and not necessarily contiguous. In an embodiment, a diversity channel is a binary vector in which values of 1 denote REs that are part of the diversity channel and values of 0 denote REs that are not part of the diversity channel. A diversity channel is an example of how an RE subset could be specified.

RE subsets are UE-specific in some embodiments. Assignment of UE-specific subsets could provide for contention-free or collision-free GF transmissions, because assigned resources are only used by one UE. In other embodiments, RE subsets could partially overlap, as shown in FIG. 2. This may result in soft collision between transmissions by UE1 and UE2, which could be resolved by a receiver, by applying low complexity multi-user detection-for example. UE-specific and non-UE-specific resource assignments are also possible. In some embodiments, non-UE-specific resource assignment can be network-specific, meaning that resources are assigned by the network. For example, resource assignments for certain transmissions, such as an initial GF transmission and/or a first subsequent GF transmission, could be UE-specific, and resource assignments for other transmissions could be non-UE-specific/network-specific.

GF communication resource selection by a UE is based on a UE identifier (UE id) in an embodiment. For example, each UE is assigned an identifier in a network, and that identifier is unique to the UE to at least a certain level of the network. UE identifiers could be unique within a cell or service area of the network, for instance. Access regions could be assigned to such service areas within which each UE is uniquely identified, and then GF resource selection by each UE based on its UE id is UE-specific and different from the GF resource selection by other UEs. UE identifiers could be used directly as an index for selection of a diversity channel, for example, or used in determining such an index or other selection criterion. Other information, such as a cell or service area identifier, could be used in combination with a UE identifier in selecting GF resources. Examples of GF resource selection based on UE identifiers and/or other information are described below.

GF resource/diversity channel selection could instead be configured by a network element or other network equipment in a communication system. For example, network equipment could transmit, to each UE, information from which the UE identifies the GF resources that are to be selected for GF transmission by the UE. This information could include an explicit identification of the GF resources, such as a diversity channel index, or an implicit identification of the GF resources. A seed for random number generation to generate a diversity channel index or other identifier of a diversity channel is one example of an implicit indication from which a UE determines the GF resources that it is to use for GF transmission in an embodiment. Another example could be a seed for a hopping pattern and/or interleaving pattern from which the overall diversity channel can be obtained by the UE. Diversity channel assignments to each UE by the network could be static, semi-static, or dynamic.

A combination of these techniques for GF resource/diversity channel selection by or allocation to UEs is also possible.

It should be noted that assigned or selected GF resources could be UE-specific, but need not necessarily be UE-specific in all embodiments. For example, diversity channel selection or assignment could instead be based on groups of UEs. A diversity channel could be assigned to a group of UEs, and all UEs inside the same group would then have the same diversity channel. Such a group assignment or selection could be based on a "group" UE id or other information from which group members are identifiable. In some embodiments, each UE in a group uses a subset of the diversity channel assigned to the group, and that subset could be referred to as a second diversity channel. The second diversity channel could be UE-specific and could be obtained, for example, based on group UE id and individual UE id, and could be assigned by the network in a static, semi-static, or dynamic fashion. Other features of group-assigned diversity channels could be the same as the UE-specific case, because the method of diversity channel assignment or selection does not necessarily affect how diversity channels are designed.

As described above, either or both of communication resource assignment/allocation to GF transmissions and UE GF resource/diversity channel selection could involve transmitting information from network equipment to UEs.

Figure 3:
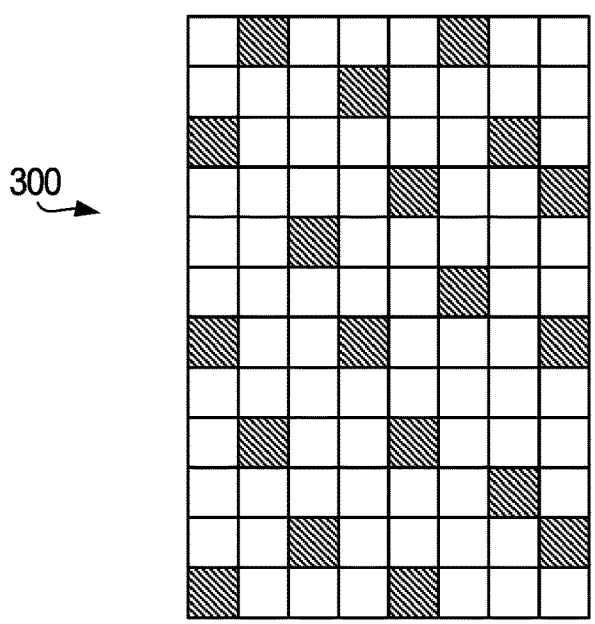
FIG. 3 is a block diagram illustrating another example of an access region.

FIG. 3 is a block diagram illustrating another example of an access region. In FIG. 3, each block in the grid 300 represents an RE. The shaded blocks represent REs in a grant-free access region that have been assigned to a diversity channel, and the blank blocks represent REs that are not assigned to the diversity channel. The REs represented by the blank blocks, in FIG. 3 and other drawings, could include REs that are assigned to the access region.

In an embodiment, a diversity channel is function of a number of REs (m) that are to be assigned to a UE for GF transmission and total access region bandwidth for GF transmission. The total access region bandwidth corresponds to the total number of assigned REs (the shaded blocks in FIG. 3) for GF transmissions, denoted by N:

Diversity channel=$f(m,N)$.

The total number of such diversity channels is $\binom{N}{m}$, and the function f gives one or a few of these diversity channels as output. The number of REs in a diversity channel (the number of shaded blocks in FIG. 3), m, could be a function of spectral efficiency of a signal that is to be transmitted by GF transmission, and/or packet size, for example. In an embodiment, m is larger for larger packet sizes. In other embodiments, m can be function of the application type and/or one or more required or target key performance indicator(s) (KPI(s)). One example of a KPI could be peak to average power ratio (PAPR).

In some embodiments, a sparsity ratio which can be expressed as m/N, can be obtained from packet size and operating point(s) of a forward error correction (FEC) rate, to achieve target or optimal performance. Assuming that a modulation size (M) is fixed, packet size is L bits, and the optimum FEC rate is r, sparsity ratio can be obtained from sparsity ratio=$L/(r*\log 2(M)*N)$. In some embodiments, the sparsity ratio can be signaled from network equipment to a UE. In some other embodiments, the sparsity ratio is signaled from a UE to network equipment. In some other embodiments, the sparsity ratio is implicit and can be linked to information such as application type, packet size, re-configured/pre-defined FEC rate and/or modulation order, and there is no need for explicit signaling of sparsity ratio. In some embodiments, the granularity of sparsity ratio can be adjusted by changing N. For example, with N=4, sparsity ratios of 1/4, 1/2, 3/4, and 1 are possible, while with N=8, more options of sparsity ratios including 1/8, 1/4, 3/8, 1/2, 5/8, 3/4, 7/8, and 1 are possible.

In the diversity channel example above, f is a mapping function, and could be based on a UE or group identifier, for example. In another embodiment, f is also or instead linked to a Reference Signal (RS) sequence, which may be used for channel estimation and/or UE identification, or other information that may or may not be UE-specific. In some embodiments, each UE could include a respective UE-specific interleaver, scrambler, or randomizer, a UE-specific hash function, and/or a UE-specific hopping pattern. Any or all of these could be used in defining a UE-specific mapping function f, and/or other GF diversity channel parameters such as m. In other embodiments, mapping functions and GF diversity channels are not UE-specific. In other embodiments, f is an interleaving function expressed as permutation matrix which takes the vector [1 1 1 . . . 1 0 0 0 0 . . . 0] as input, wherein the vector includes m ones followed by or zero-padded by N-m zeros. In another embodiment, f is a scrambling function expressed as a permutation matrix which takes the vector [1 1 1 . . . 1 0 0 0 0 . . . 0] as input, wherein the vector, as in the above example, includes m ones followed by or zero-padded by N-m zeros.

Diversity channel parameters such as the mapping function f and/or m could also or instead be based on or otherwise linked to a New Radio (NR) cell identifier or other service area identifier.

Other information such as PAPR could be taken into account in determining diversity channel parameters. For example, some diversity channels may be known to result in lower PAPR than others and therefore, if a low-PAPR signal transmission is desired for a UE, then its diversity channel might be selected from those diversity channels.

FIG. 4 is a block diagram illustrating an example of a multi-level diversity channel design. Two levels are shown in FIG. 4, corresponding to diversity channel selection or assignment in two steps, but additional levels could be used in other embodiments. As shown at 400, an access region is partitioned into multiple partitions or sub-regions 402. The blank sub-regions do not include any assigned REs, and the shaded sub-regions include assigned REs. One of the sub-regions with assigned REs is shown at 404, with assigned REs 406 shown as shaded blocks. The blank blocks at 404 represent REs that are not assigned to the example second-level diversity channel.

A first level of the example two-level diversity channel is defined over the partitions 402 of the access region 404. A second level of the example diversity channel is defined over the REs 406 inside each partition 402. Each level of a multi-level diversity channel could be designed based on the functions and/or other characteristics described herein.

For example, in the case of a two-level diversity channel, there could be two functions f1 and f2:

f1 (m1, N1), where m1 is the number of partitions assigned for the diversity channel and N1 is the total number of partitions in the access region;

f2 (m2,N2), where m2 is the number of REs that are assigned for the UE and N2 is the total number of REs in each partition.

In some embodiments, the relation between m1, N1, m2, N2, m and N can be expressed as:

$$N=N1*N2 \text{ and } m=m1*m2.$$

In this example, the function f1 could provide the location(s)/position(s) of the active partition(s) that are assigned or allocated for use by the UE for grant free transmission from the whole access region, and the function f2 could provide the location(s)/position(s) of the assigned or allocated resource element(s), from inside the active partition(s), assigned to the UE for grant free transmission. In an embodiment, the input of each function is the total available resource units (RUs), which would be either REs for fb or partitions for f1 in the example above, and the number m1 or m2 of utilized RUs, and the output of each function provides the location(s)/position(s) of the utilized RUs. The output of each function f1, f2 could be a binary vector indicating the location/position of utilized RUs with values of ones, with all other values being zero, for example.

In some embodiments of two-step diversity channel generation, a sparsity ratio can be expressed as m/N=m1/N1*m2/N2 which is equal to the product of sparsity ratios of the two levels of diversity channel generation. The sparsity ratio could be obtained, for example from packet size and operating point(s) of a forward error correction (FEC) rate, to achieve target or optimal performance. Assuming that a modulation size (M) is fixed, the packet size is L bits, and the optimum FEC rate is r, sparsity ratio can be obtained from sparsity ratio=L/(r*log 2(M)*N). In some embodiments, the sparsity ratio can be signaled from network equipment to a UE. In some other embodiments, the sparsity ratio is signaled from a UE to network equipment. In some other embodiments, the sparsity ratio is implicit and can be linked to information such as application type, packet size, re-configured/pre-defined FEC rate and/or modulation order, and there is no need for explicit signaling of sparsity ratio. Once the sparsity factor is determined, it can be mapped to sparsity ratio of each level of diversity channel. For example, the first sparsity ratio (m1/N1) can be defined fixed as s, then the second level sparsity ratio can be obtained from second level sparsity ratio=L/(r*log 2(M)*N*s). In some other embodiments, the two-level sparsity ratios can be assumed equal, so they can be obtained from first/second level sparsity ratio=sqrt(L/(r*log 2(M)*N)). In some embodiments, the granularity of sparsity ratio can be adjusted by changing N1 and/or N2. For example, with N1=4, sparsity ratios of 1/4, 1/2, 3/4 and 1 are possible for the first diversity channel, while with N1=8, more options of sparsity ratios for the first diversity channel including 1/8, 1/4, 3/8, 1/2, 5/8, 3/4, 7/8, and 1 are possible.

Either or both of f1 and f2 could be based on the UE or UE group information and/or other characteristics described above, for example. In a higher-order diversity channel, there could be additional levels of partitioning and additional UE-specific or non-UE-specific functions.

FIG. 4A is a flow diagram illustrating an example method of obtaining a multi-level diversity channel. The example method 450 involves partitioning a GF access region into partitions at 452. The partitioning at 452 could be performed by network equipment and signaled to UEs, performed by UEs, or pre-configured in UEs. Also, the selection of the number of partitions (N1) and the size of each partition (N2) can be determined by network equipment and signaled to UEs, performed by UEs, or pre-configured in UEs. The selection of such parameters can be based on, but not limited to, traffic load, application type, diversity channel pool size, and required or target KPI(s). At 454, based on traffic requirement(s) for example, the GF UEs select or obtain a partition (for two-level diversity channels in FIG. 4) or multiple levels of partitions (for higher order diversity channels). At 456, the UE transmits traffic in a GF uplink transmission in a diversity channel shown in FIG. 4. Either or both of the selections at 454, 456 could be performed by network equipment and signaled to UEs, or performed by UEs. The fb and fb functions described above are examples of functions that could be used in the selections at 454, 456, respectively.

In some embodiments, partitions can be defined as basic resource units, including but not limited to resource blocks (RBs) defined over slots or mini-slots or symbols. In this case, the first level diversity channel defines the basic resource units used for each UE for data transmission. In other embodiments, each basic resource unit can further be partitioned and the diversity channels can be defined over those partitions. In other embodiments, the final diversity channel can be represented as the selected basic resource units in conjunction with the set of diversity channels defined over each basic resource unit. The set of diversity channels inside each basic resource unit can be obtained, for example, by hopping patterns which can be the same for each basic resource unit or different between different resource units.

FIG. 5 is a block diagram illustrating an example of a partition and hopping-based diversity channel design. Similar to the multi-level diversity channel described above with reference to FIG. 4, the example partition-based diversity channel in FIG. 5 is generated by first defining partitions 502, six in this example, of the overall access region 500. The diversity channel defined over each partition 502 may also be referred to as a basic diversity channel, one of which is shown at the bottom of FIG. 5.

Suppose that the total number of partitions 502 is M. L different diversity channels $c_1, \ldots, c_L$ could be defined for each partition 502 based on any of the methods described herein. Defining a hopping pattern from each partition 502 to another partition provides an overall diversity channel that is the union of the diversity channels for each partition:

$$DC=[DC_1, \ldots, DC_M], \text{ where } DC_i \in \{c_1, \ldots, c_L\}.$$

For a hopping sequence of {1,2,3,4,5,6} for diversity channel assignment to a particular UE, for example, the overall diversity channel includes a set of diversity channels $[c_1, c_2, \ldots, c_6]$ from respective partitions. In general, the diversity channel can be represented by a sequence of numbers, each indicating an index of the basic diversity channel in each partition. In some embodiments, the sequence of numbers can be generated using a randomizer seed, similar to the interleaver pattern in LTE. The randomizer seed can be assigned to the UEs by the network, or can be mapped to and/or obtained by the UE id or group UE id.

Either or both of the partition diversity channels and the hopping pattern could be UE-specific, and could be based on the UE-specific information and/or other characteristics described herein. In other embodiments, the partition diversity channels and the hopping pattern are not UE-specific, but associated with multiple UEs in a UE group, for example.

In an embodiment, each partition diversity channel is defined with only one position in each diversity channel vector having a value of 1 and other vector positions set to 0, and the size of partition is K REs. In other words, only one RE in each partition is assigned to the UE. For example, the location of the "1" bit in each partition diversity channel vector, and thus the location or position of an RE assigned to a UE could be specified by:

(UEid mod K)+1.

This could be useful in a low-PAPR diversity channel design, for example.

In another embodiment, the location of the "1" bit in a partition i diversity channel vector is specified by f_i(UEid mod K), where f_i are pre-defined functions for each partition i, to provide a hopping pattern between the partition diversity channels based on the function f_i. This type of diversity channel definition could be used to make the location of the "1" bit in each partition diversity channel vector random, for example.

For two-step or two-level diversity channels based on partitions/RBs and REs, two vectors could be used to specify the location(s) or position(s) of one or more REs assigned to a UE, and the location(s) or position(s) of one or more partitions/RBs that include the one or more REs. This could be extended to more than two steps or levels of diversity channels.

The diversity channel design/selection techniques described herein could be performed by a UE based on REs that are assigned to an access region, for example. In another embodiment, a set of diversity channels is "pre-designed" and stored in a lookup table (LUT) in memory.

Such pre-designed diversity channels, as well as others described herein based on an access region, could have different sparsity levels (different numbers of assigned resources). Diversity channels could be designed in a random fashion without any particular structure, or with structures or patterns based on one or more criteria. One example is to design diversity channels to minimize probability of pair-wise catastrophic collision between the patterns by using Optical Orthogonal Codes (OOC). This involves using these codes for a purpose other than the purpose for which they were originally intended.

An OOC of (n, k, λ) is a family of sequences of length n, with n-k zeros and k ones, whose pair-wise overlap and cyclic shifts is at most λ. All of the cyclic shifts of OOC sequences could be used as different signatures, unlike in optical CDMA. For example, for a block of 25 tones, 100 different sequences of 3 nonzero tones could be used, with each pair of them overlapping at most in one tone (4 OOC×25 cyclic shifts): {0,1,6}, {0,2,9}, {0,3,11}, {0,4,13}

In some embodiments, using pre-designed diversity channels based on hopping pattern includes selection of a pool of hopping patterns based on one or more criteria. These criteria could include, but are not limited to, minimizing the number of collisions, i.e. using the same diversity channel over each partition. For example, if 3 diversity channels are needed and there are 6 partitions and 3 basic diversity channels indexed by 1,2 and 3, the following diversity channels ensure no collision over each partition:

DC1={1 2 3 1 2 3}, DC2={3 1 2 3 1 2}, DC3={2 3 1 2 3 1}.

Regardless of the method used for generating diversity channels, a given number of diversity channels, say N, could be generated offline by network equipment and stored in a lookup table (LUT). For example, the LUT may contain a list of basic diversity channels and hopping sequences to generate the overall diversity channels. In another example, the LUT may contain permutation matrices describing or modeling the interleaving/scrambling pattern to generate the desired diversity channels. In some embodiments, the LUT might not include the whole list of diversity channels. For example, it may contain only list of basic diversity channels or some basic permutation matrices or the like. Then, each UE can generate its own diversity channel based on this list and some indicators including but not limited to randomizer seed and/or hash function, which could be mapped to UE id or group UE id.

The assignment of a diversity channel to each UE could be configured and sent to each UE by network equipment. For example, a randomizer seed or hash function could be assigned and transmitted to a UE, and the UE could then select its diversity channel from the LUT based on an index that is determined from the randomizer seed or hash function. In embodiments using two-step diversity channel generation/assignment, a pool of the first diversity channels (partitions/RBs, for example) and/or the pool of the second diversity channels can be signaled to UEs using semi-static/RRC/higher layer signaling or using dynamic signaling. In some embodiments, a mapping function between a UE id/group UE id and the selection of each diversity channel can also or instead be signaled to UEs. Such a mapping function could include the functions fb and f2, one or more randomizer seeds, hashing functions, interleaver/scrambling patterns and/or hopping sequences, for example. In another embodiment, a mapping function is pre-configured and no signaling is involved. In embodiments using one-step or one-level diversity channel generation/assignment, the pool of the diversity channels can be signaled to the UEs using semi-static/RRC/higher layer signaling or using dynamic signaling. In some embodiments, a mapping function between a UE id and selection of each diversity channel can also or instead be signaled to UEs. Such a mapping function could include the function f, a randomizer seed, hashing functions, interleaver/scrambling patterns and/or hopping sequences. In some other embodiments, there is no signaling for the selection of diversity channels and just the mapping function or rule between a UE id/group UE id to generate the diversity channel is signaled to UEs. In this case, the mapping function allows the diversity channel to be directly derived based on such parameters as a number of non-zero REs and a total number of REs. In another embodiment, the mapping function is pre-configured and no signaling is involved.

Each UE could instead select a diversity channel based on its desired sparsity level and UE id, for example. The LUT could be accessed in memory, searched for subsets of the desired sparsity level, and then each UE could select the diversity channel with the index: UEid mod n, for example, where n is total number of diversity channels.

UE diversity channel assignment could also or instead be based on other UE-specific or non-UE-specific information and/or other characteristics described herein.

In an embodiment, different LUTs are used in different cells or coverage areas. In another embodiment, a global LUT is used, and UEs look up an index in the LUT based on UEid and a cell identifier, for example. Other information could also or instead be taken into account in determining an index of a diversity channel or otherwise identifying a diversity channel that is to be selected by each UE.

As noted above, diversity channels could have different sparsity levels, including different numbers of REs. A UE might select a diversity channel that includes a number of REs to transmit a packet that is below a certain length, and select a diversity channel that includes a higher number of REs to transmit a longer packet, for example. Different subsets of an LUT could be searched to select a diversity channel that has the desired size for a particular GF transmission. In some embodiments, the selection of sparsity level can be based on other requirements including but not limited to PAPR requirement, reliability requirement and the like.

Other features described herein could be applied in populating and/or selecting diversity channels from an LUT. For example, a GF access region could be partitioned into number of partitions, and a large pool of basic diversity channels could be defined for each partition. Partitioning and basic diversity channel information could be stored in an LUT. In some embodiments, the number of partitions could be dynamically or semi-statically configured by the network and stored in the LUT.

In some embodiments, data that was transmitted by GF transmission may be transmitted in a further GF transmission. Such subsequent transmission could be acknowledgement (ACK)/negative acknowledgement (NACK)-based retransmission or ACK/NACK-less repetition, for example. Examples of retransmission techniques are described, for example, in U.S. patent application Ser. No. 15/088,607, filed on Apr. 1, 2016, the entire contents of which are incorporated herein by reference.

For ACK/NACK-based retransmission, after the first GF transmission by a UE, the receiver sends a NACK if the data is not decoded correctly, and the UE retransmits the data responsive to the NACK. There could be a one-to-one mapping between the diversity channel for the first transmission and the diversity channel for the next retransmission(s). This mapping could be UE-specific, non-UE-, or combination thereof. This mapping could be configured by the network based on assigning a randomizer seed or hash function, for example. In some embodiments, the mapping can also or instead be based on the UE id and/or other UE-specific or non-UE-specific information or characteristics described herein.

A diversity channel could be assigned to a UE by the network, for its retransmission. Network equipment such as a network element could send to the UE a diversity channel index among a set of candidate diversity channels (explicit signaling) or other information from which the UE can identify its retransmission diversity channel index (implicit signaling).

For ACK/NACK-less retransmission, a UE does not wait for an ACK/NACK, and may retransmit data a certain (possibly configurable) number of times, or until the receiver sends a signal to request that the UE not send any further retransmissions. This is also referred to as repetition. This might be applied to low-latency applications such as in a uRLLC scenario, for example, where there is a latency constraint for decoding signals from UEs.

In this case, the initial diversity channel selection or assignment could involve selecting or assigning multiple diversity channels, for the first transmission and the next subsequent transmission(s), which could include retransmission(s) and/or repetition(s). In this manner, a transmission and retransmission/repetition sequence could involve first selecting or assigning a primary set of diversity channels and a hopping sequence for selecting a particular diversity channel for the initial transmission and each subsequent retransmission/repetition.

The primary set of diversity channels could be selected by each UE or configured by the network, based on assigning a randomizer seed or hash function from which UE can select the primary set of diversity channels from an LUT, for example. In another embodiment, the selection or assignment of the primary set of diversity channels is also or instead based on a UE id and/or other information or characteristics described herein. The primary set of diversity channels could be specified in a vector of diversity channels, for example.

Similarly, a hopping pattern between the primary diversity channels could be selected by each UE configured by the network, based on assigning a randomizer seed or hash function. In another embodiment, the hopping pattern between the primary diversity channels is also or instead based on a UE id and/or other information or characteristics described herein.

The assignment of the set of diversity channels for initial transmission and retransmission(s) could also or instead take into account certain criteria, including increasing or maximizing diversity by allowing the diversity channels to span the whole GF access region, for example.

It is also possible that the sparsity level of diversity channels assigned from one transmission to another changes.

Figures 6, 7:
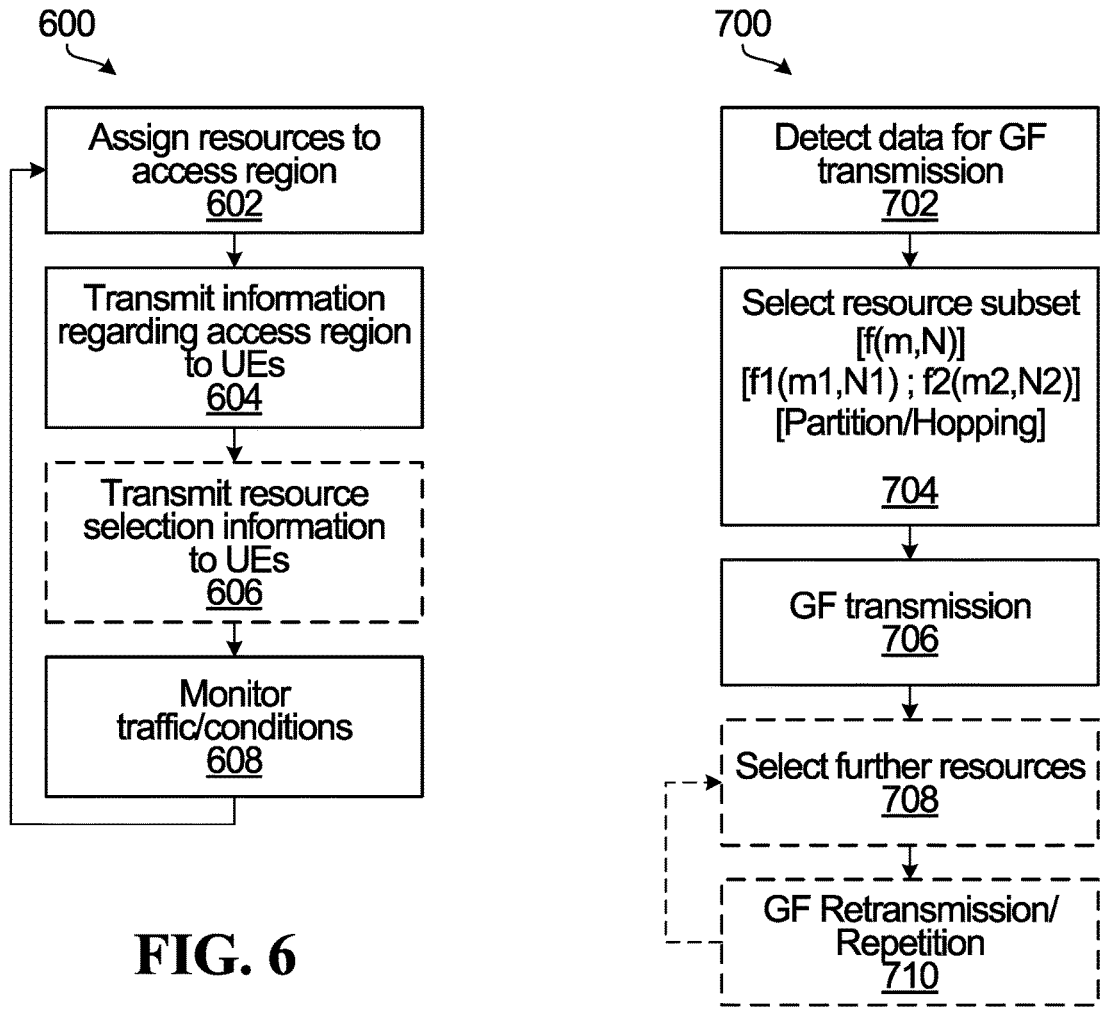
FIGS. 6, 7 and 7A are flow diagrams illustrating example methods.
Figure 7A:
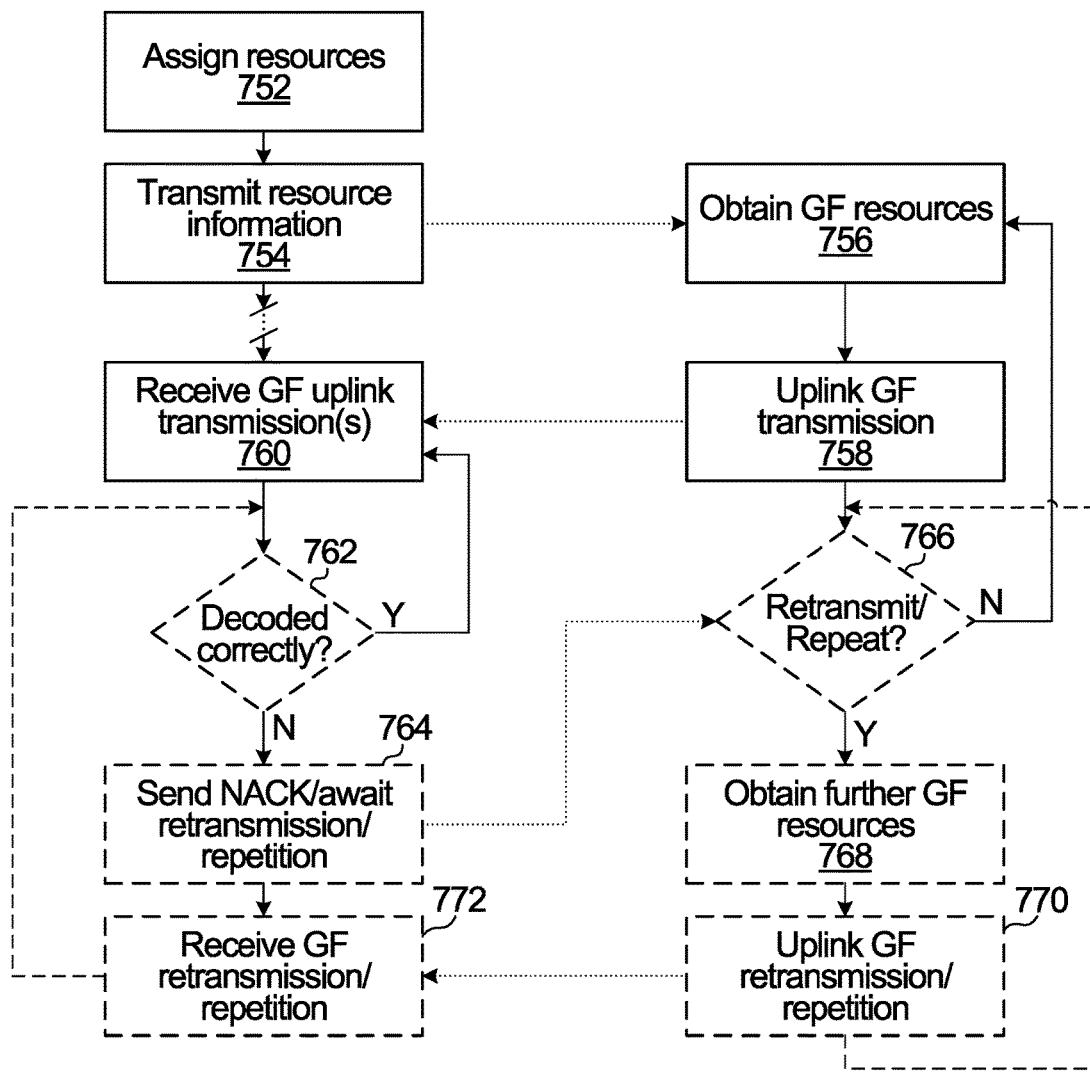

FIGS. 6, 7 and 7A are flow diagrams illustrating example methods.

The example method 600 involves an operation 602 of assigning a set of communication resources for GF transmission (an access region in FIG. 6) to a UE or group of UEs in a communication system. A method could also include assigning, to the UE or the UEs in the group of UEs, a set of diversity channels in the set of communication resources assigned for GF transmission. In some embodiments, a respective set of one or more UE-specific diversity channels is assigned to each UE.

In another embodiment, diversity channels could be network-specific for example, and the same diversity channel(s) are assigned to more than one UE. In some embodiments, diversity channel assignments are UE-specific in the sense that each UE is assigned a diversity channel, but a diversity channel assignment rule to UEs is a one-to-many mapping, meaning that one diversity channel may be configured or assigned to more than one UE.

Information regarding the assignment of resources to the access region for GF transmission could be transmitted to the UE(s) at 604, and resource selection information regarding the set of diversity channels could also or instead be transmitted to the UE(s) at 606. The information that is transmitted at 606 in some embodiments includes information from which a UE identifies its assigned set of diversity channels, and could include an explicit identification of its assigned set of diversity channels or an implicit identification of its assigned set of diversity channels. In other embodiments, there is no signalling to the UEs regarding the assigned set of diversity channels. For example, in some embodiments the assigned set of diversity channels can be obtained by the UE from a stored LUT and the randomizer seed, hashing function or the like which is mapped to the UE id. In this case, the operation at 606 is skipped.

The operations at 604, 606 are illustrative of one possible signaling mechanism. Such two-step signaling as shown could involve one transmission of information at 604, from which an access region could be identified by UEs, and another transmission of information from which channelization, which is UE-specific diversity channelization in some embodiments, can be determined by UEs. In another embodiment, one step signaling of access region and channelization is used.

The example method 600 illustrates operations that are performed by a network element and/or other network equipment in an embodiment. The example method 700 is illustrative of an example method performed at a UE.

The example method 700 includes detecting data for GF transmission, at 702. Any of various techniques, such as monitoring queue levels, could be used to determine at 702 when a UE has data to transmit. From a set of communication resources such as an access region, a subset of those resources is selected for a grant-free transmission by the UE, at 704. Examples of diversity channels, which may or may not be UE-specific, are shown at 704 and further described herein. Data is transmitted by grant-free transmission from the UE at 706, using the selected subset of communication resources.

Some embodiments may provide for subsequent, further transmission of data, including retransmission and/or repetition of data. In such embodiments, a UE could also select a further subset of the communication resources for a grant-free retransmission/repetition of the data at 708, and retransmit the data at 710 by grant-free transmission from the UE using the selected further subset of the communication resources. Different subsets of communication resources could be selected and used for each subsequent transmission. This is represented by the dashed arrow from 710 to 708 in FIG. 7.

The selections at 704, 708 could be made at the same time, to select both GF transmission and GF retransmission/repetition diversity channels, for example.

The selecting at 704 and/or 708 could be based on an identifier of the UE, signaling or information received by the UE from network equipment in the communication system, one or more functions as shown at 704, or partitions and a hopping sequence as shown at 704, for example. The selecting could also or instead involve selecting from a look up table.

As noted above, the example method 600 illustrates operations that are performed by a network element and/or other network equipment in an embodiment, and the example method 700 is illustrative of a method performed at a UE. FIG. 7A illustrates an example method that includes both network-side and UE-side operations.

The example method 750 involves assignment of GF resources at 752. The network equipment could handle resource assignment to an access region at 752, and could also assign resources to access channels and/or assign access channels to UEs. The network equipment transmits resource information to one or more UEs at 754. The resource information could include explicit and/or implicit signalling of the access region, and possibly the diversity channel assignment.

At 756, a UE obtains GF resources, illustratively a diversity channel, for use in a GF transmission. Obtaining GF resources could involve any of the resource or diversity channel selection options disclosed herein. At 758, the UE transmits an uplink GF transmission.

At 760, the network equipment receives the uplink grant-free transmission from the UE in a first diversity channel of the access region. The network equipment could also receive a second uplink grant-free transmission from a second UE in a second diversity channel of the access region. The first diversity channel and the second diversity channel contain at least one RE and may partly overlap in the access region.

In some embodiments, the network equipment may determine whether data in the GF transmission(s) is decoded correctly, at 762, and if not, send a NACK to the UE that transmitted the uplink GF transmission, or just await a retransmission/repetition in an ACK/NACK-less embodiment.

At 766, the UE determines whether a retransmission/repetition should be made. This determination could be based on receiving a NACK, or in some embodiments a certain number of retransmissions/repetitions may be made automatically unless or until a receiver to which the GF transmission was transmitted acknowledges the GF transmission. Further resources, such as a further diversity channel, are obtained by the UE at 768, and an uplink GF retransmission is transmitted at 770. Subsequent retransmissions/repetitions may also be made using different resources/diversity channels. Obtaining further resources for retransmission/repetition at 768 could be implemented as part of obtaining resources at 756. Uplink GF transmission resources and uplink GF retransmission/repetition resources could be obtained at 756, before an initial uplink GF transmission.

At 772, the network equipment receives an uplink GF retransmission, and the operations at 762, 764, 772 may be repeated if multiple retransmissions/repetitions are made by the UE.

The example methods 600, 700, 750, as well as the earlier example method 450, are illustrative of embodiments. Other embodiments could include different or additional operations. The order in which operations are performed could also be similar to or different from the order shown in FIGS. 4A, 6, 7 and 7A. Examples of additional operations that may be performed, and/or various ways to perform the illustrated operations, may be or become apparent.

For example, as shown generally in FIG. 7A, a method for uplink data transmission could involve a UE obtaining GF resources at 756. In an embodiment, a UE obtains at least one diversity channel for uplink grant free data transmission. In an embodiment, the at least one diversity channel includes uplink grant free transmission resources assigned to the UE, and the uplink grant free transmission resources include one or more positions corresponding to partitions of an access region and one or more positions corresponding to REs in each partition of the access region. A method may also involve transmitting, by the UE, an uplink initial data transmission at 758 and a subsequent transmission at 770 in the at least one diversity channel without receiving grant information from a network equipment.

Variations of UE operations in the example method 1750, and/or other example methods disclosed herein, could include any one or more of the following:

the REs assigned to the UE within the access region are non-contiguous;

receiving, by the UE, signalling to indicate the at least one diversity channel;

the signalling includes at least one index having a predefined relationship with the at least one diversity channel, such as one or more partition indices and/or one or more RE indices;

the at least one diversity channel is associated with an identification of the UE, and the UE obtains the at least one diversity channel from a look up table based on the identification of the UE;

the at least one diversity channel is a two-level diversity channel defined by functions f1 and f2:f1(m1,N1), where m1 is the number of partitions assigned for the diversity channel and N1 is the total number of partitions in the access region; f2(m2,N2), where m2 is the number of REs that are assigned for the UE and N2 is the total number of REs in each partition;

transmitting, by the UE, the subsequent transmission in the at least one diversity channel after the UE receives a NACK from the network equipment or based on an ACK/NACK less scheme.

Similarly, FIG. 7A, also generally shows, in a method for uplink data transmission, receiving by a network equipment an uplink initial data transmission at 760 and a subsequent transmission at 772 from a UE in a first diversity channel without transmitting grant information to the first UE. In an embodiment, the first diversity channel includes uplink grant free transmission resources assigned to the UE, and the uplink grant free transmission resources include one or more positions corresponding to partitions of an access region and one or more positions corresponding to REs in each partition of the access region.

Variations of network equipment operations in the example method 1750, and/or other example methods disclosed herein, could include any one or more of the following:

receiving, by the network equipment, an uplink initial data transmission and a subsequent transmission from a second UE in a second diversity channel without transmitting grant information to the second UE the first diversity channel includes at least one RE partly overlapping with the second diversity channel;

transmitting, by the network equipment, signalling to indicate the first diversity channel;

the signalling includes at least one index having a predefined relationship with the first diversity channel, such as one or more partition indices and/or one or more RE indices;

the first diversity channel is associated with an identification of the first UE, and the identification of the first UE has a predefined relationship with the first diversity channel;

the first diversity channel is a two-level diversity channel defined by functions f1 and f2: f1(m1,N1), where m1 is the number of partitions assigned for the diversity channel and N1 is the total number of partitions in the access region; f2(m2,N2), where m2 is the number of REs that are assigned for the UE and N2 is the total number of REs in each partition.

Figure 8:
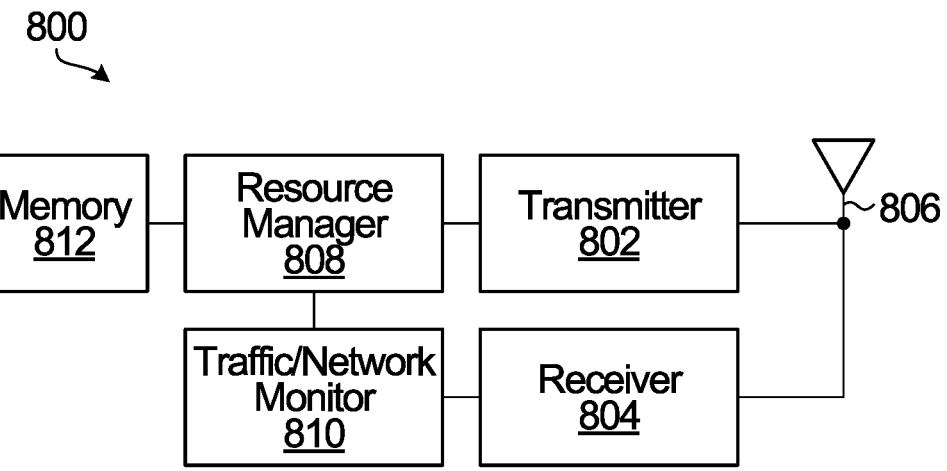
FIG. 8 is a block diagram illustrating example network equipment.

FIG. 8 is a block diagram illustrating example network equipment. The example network equipment 800 includes a transmitter 802 and a receiver 804 coupled to one or more antennas at 806. The network equipment 800 also includes a resource manager 808 coupled to the transmitter 802 and a traffic/network monitor 810, which is coupled to the receiver 804 and to the resource manager. A memory 812 is coupled to the resource manager 808.

Hardware, firmware, components that execute software, or some combination thereof might be used in implementing at least the transmitter 802, the receiver 804, the resource manager 808, and the traffic/network monitor 810. Electronic devices that might be suitable for implementing any or all of these components include, among others, microprocessors, microcontrollers, Programmable Logic Devices (PLDs), Field Programmable Gate Arrays (FPGAs), Application Specific Integrated Circuits (ASICs), and other types of "intelligent" integrated circuits.

Software that may be used in operation of the network equipment 800, and/or an LUT or other information involved in communication resource management, could be stored in the memory 812. The memory 812 includes one or more physical memory devices. Memory devices could instead be internal to one or more of the components shown in FIG. 8. External memory devices operatively coupled to the illustrated components, or to one or more processors that implement those components, are also possible. Examples of memory devices are provided above.

The transmitter 802 could perform such operations as frequency up-conversion and modulation, and the receiver 804, which could be integrated with the transmitter 802 in a transceiver or separately as shown, could perform inverse operations, including frequency down-conversion and demodulation. The transmitter 802 and the receiver 804 could perform other operations instead of or in addition to these example operations, depending on the specific implementation and the types of communication functions and protocols to be supported. The transmitter 802 and the receiver 804 are operative transmit communication signals to and receive communication signals from at least UEs. The same transmitter 802 and receiver 804, or a different transmitter and receiver, may enable the network equipment 800 to communicate with network elements and/or other network equipment in a communication network.

The antenna shown at 806 could include separate receive and transmit antennas or sets of antennas, or the same antenna or set of antennas could be used for both transmitting and receiving communication signals. The antenna(s) at 806 would be compatible with UE antennas to enable communications between the network equipment 800 and UEs. Network equipment may include other components, such as one or more interfaces to other network equipment, for example.

The resource manager 808, or a processor in a processor-based embodiment, is operative to assign a set of communication resources for grant-free transmission to a UE or group of UEs in a communication system, and assign, to the UE or the UEs in the group of UEs, a set of diversity channels in the set of communication resources assigned for grant-free transmission. In some embodiments, the resource manager 808, or a processor in a processor-based embodiment, is configured to also or instead implement other features described herein.

In some embodiments, the receiver 804 is operative to receive a first uplink grant-free transmission from a first UE in a first diversity channel of an access region, and a second uplink grant-free transmission from a second UE in a second diversity channel of the access region. The first diversity channel and the second diversity channel include at least one RE and may partly overlap in the access region.

The traffic/network monitor 810, or a processor in a processor-based embodiment, could monitor traffic and provide traffic information to the resource manager 808 for use in assigning resources to access regions and/or to UEs. The traffic/network monitor 810, or a processor in a processor-based embodiment, could also or instead process received uplink GF transmissions and retransmissions/repetitions, and/or determine whether data received in uplink GF transmissions and retransmissions/repetitions is correctly decoded and if so send a NACK or otherwise request retransmission in some embodiments, for example.

In some embodiments, one or more of the resource manager 808, the transmitter 802, the receiver 804, and/or the traffic/network monitor 810, or a processor in a processor-based embodiment, is configured to also or instead implement other features disclosed herein. Examples of additional operations that may be performed by the network equipment 800 and/or components thereof, as well as various ways to perform such operations, are described herein.

For example, FIG. 8 is illustrative of network equipment that includes a transmitter 802, and a receiver 804 to receive an uplink initial data transmission and a subsequent transmission from a first UE in a first diversity channel without transmitting grant information to the first UE. As described in detail herein, the first diversity channel could include uplink grant free transmission resources assigned to the first UE, and the uplink grant free transmission resources could include one or more positions corresponding to partitions of an access region and one or more positions corresponding to REs in each partition of the access region.

Embodiments could include any one or more of the following:

the receiver is further configured to receive an uplink initial data transmission and a subsequent transmission from a second UE in a second diversity channel without transmitting grant information to the second UE;

the first diversity channel includes at least one RE partly overlapping with the second diversity channel;

the transmitter is configured to transmit signalling to indicate the first diversity channel;

the signalling includes at least one index having a predefined relationship with the first diversity channel, such as one or more partition indices and/or one or more RE indices;

the first diversity channel is associated with an identification of the first UE, and the identification of the first UE has a predefined relationship with the first diversity channel;

the first diversity channel is a two-level diversity channel defined by functions f1 and f2: f1(m1,N1), where m1 is the number of partitions assigned for the diversity channel and N1 is the total number of partitions in the access region; f2(m2,N2), where m2 is the number of REs that are assigned for the UE and N2 is the total number of REs in each partition.

Figure 9:
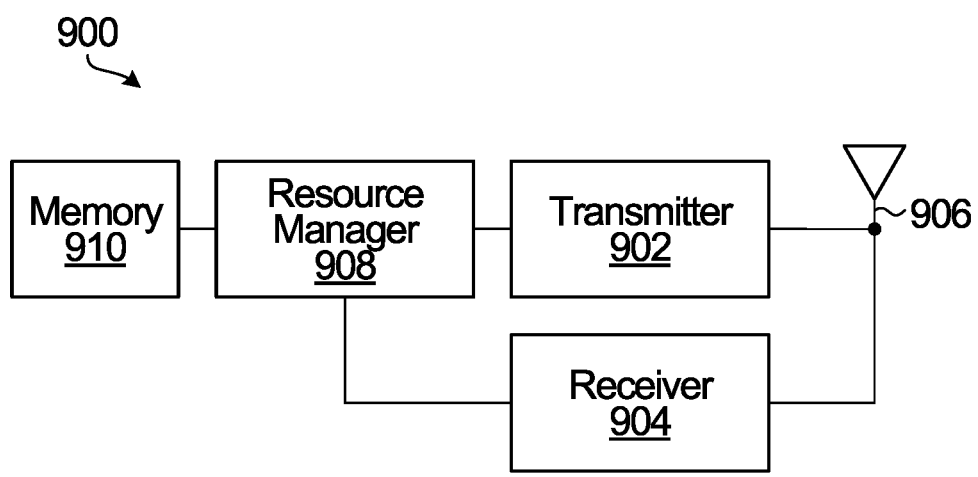
FIG. 9 is a block diagram illustrating an example UE.

FIG. 9 is a block diagram illustrating an example UE. The example UE 900 includes a transmitter 902 and a receiver 904 coupled to one or more antennas at 906, a resource manager 908 coupled to the transmitter and to the receiver, and a memory 910 coupled to the resource manager.

In general, hardware, firmware, components which execute software, or some combination thereof might be used in implementing the transmitter 902, the receiver 904, and/or the resource manager 908. Examples of hardware, firmware, and components that execute software are described above with reference to FIG. 8.

Software that may be used in operation of the UE 900, and/or an LUT or other information involved in communication resource management, could be stored in the memory 910. The memory 910 includes one or more physical memory devices. Memory devices could instead be internal to one or more of the components shown in FIG. 9. External memory devices operatively coupled to the illustrated components, or to one or more processors that implement those components, are also possible. Examples of memory devices are provided above.

The transmitter 902 could perform such operations as frequency up-conversion and modulation, and the receiver 904 could perform inverse operations, including frequency down-conversion and demodulation. The transmitter 902 and the receiver 904 could perform other operations instead of or in addition to these example operations, depending on the specific implementation and the types of communication functions and protocols to be supported. The transmitter 902 and the receiver 904 are operative to transmit and receive signals from one or more network elements a communication network.

Although a single antenna 906 is shown in FIG. 9, a UE could include multiple antennas. Separate receive and transmit antennas or sets of multiple antennas could be provided at 906, or the same antenna or set of multiple antennas could be used for both receiving and transmitting communication signals. The antenna 906 could include one or more antennas of any of various types. The type of the antenna, or each antenna, provided at 906 could be implementation-dependent.

In an embodiment, the resource manager 908, or a processor in a processor-based embodiment, is operative to select, from a set of communication resources in a communication system, a subset of the communication resources for a grant-free transmission by the UE, and the transmitter 902 is operative to transmit data by grant-free transmission from the UE using the selected subset of the communication resources.

In another embodiment, the resource manager 908, or a processor in a processor-based embodiment, is operative to obtain a first diversity channel of an access region. The access region includes multiple diversity channels for a group of UEs, and the first diversity channel includes at least one RE and partly overlaps with a second diversity channel. The transmitter 902 is operative to transmit an uplink grant-free transmission in the first diversity channel without receiving grant information.

In some embodiments, one or more of the resource manager 908, the transmitter 902, and the receiver 904, or a processor in a processor-based embodiment, is configured to also or instead implement other features disclosed herein.

For example, FIG. 9 is illustrative of a UE that includes a resource manager 908 to obtain at least one diversity channel for uplink grant free data transmission. As described herein, the at least one diversity channel could include uplink grant free transmission resources assigned to the UE, and the uplink grant free transmission resources could include one or more positions corresponding to partitions of an access region and one or more positions corresponding to REs in each partition of the access region. Such a UE could also include a transmitter 902 as shown, operatively coupled to the resource manager 908, to transmit an uplink initial data transmission and a subsequent transmission in the at least one diversity channel without receiving grant information from a network equipment Another embodiment of a UE is processor-based, and includes a processor configured to obtain at least one diversity channel for uplink grant free data transmission. The at least one diversity channel, as disclosed herein, could include uplink grant free transmission resources assigned to the UE, such as one or more positions corresponding to partitions of an access region and one or more positions corresponding to REs in each partition of the access region. Such a UE could also include a transmitter, operatively coupled to the processor, to transmit an uplink initial data transmission and a subsequent transmission in the at least one diversity channel without receiving grant information from a network equipment.

UE embodiments could include any one or more of the following:

the REs assigned to the UE within the access region are non-contiguous;

a receiver such as 904, coupled to the resource manager 908 or to the processor in a processor-based embodiment, to receive signalling to indicate the at least one diversity channel;

the signalling includes at least one index having a predefined relationship with the at least one diversity channel, such as one or more partition indices and/or one or more RE indices;

a memory such as 910, coupled to the resource manager 908 or to the processor in a processor-based embodiment, to store a look up table in which the at least one diversity channel is associated with an identification of the UE, with the resource manager or the processor being configured to obtain the at least one diversity channel from the look up table based on the identification of the UE;

the at least one diversity channel is a two-level diversity channel defined by functions f1 and f2: f1(m1,N1), where m1 is the number of partitions assigned for the diversity channel and N1 is the total number of partitions in the access region; f2(m2,N2), where m2 is the number of REs that are assigned for the UE and N2 is the total number of REs in each partition;

the transmitter is configured to transmit the subsequent transmission in the at least one diversity channel after the UE receives a NACK from the network equipment or based on an ACK/NACK less scheme.

Figure 10:
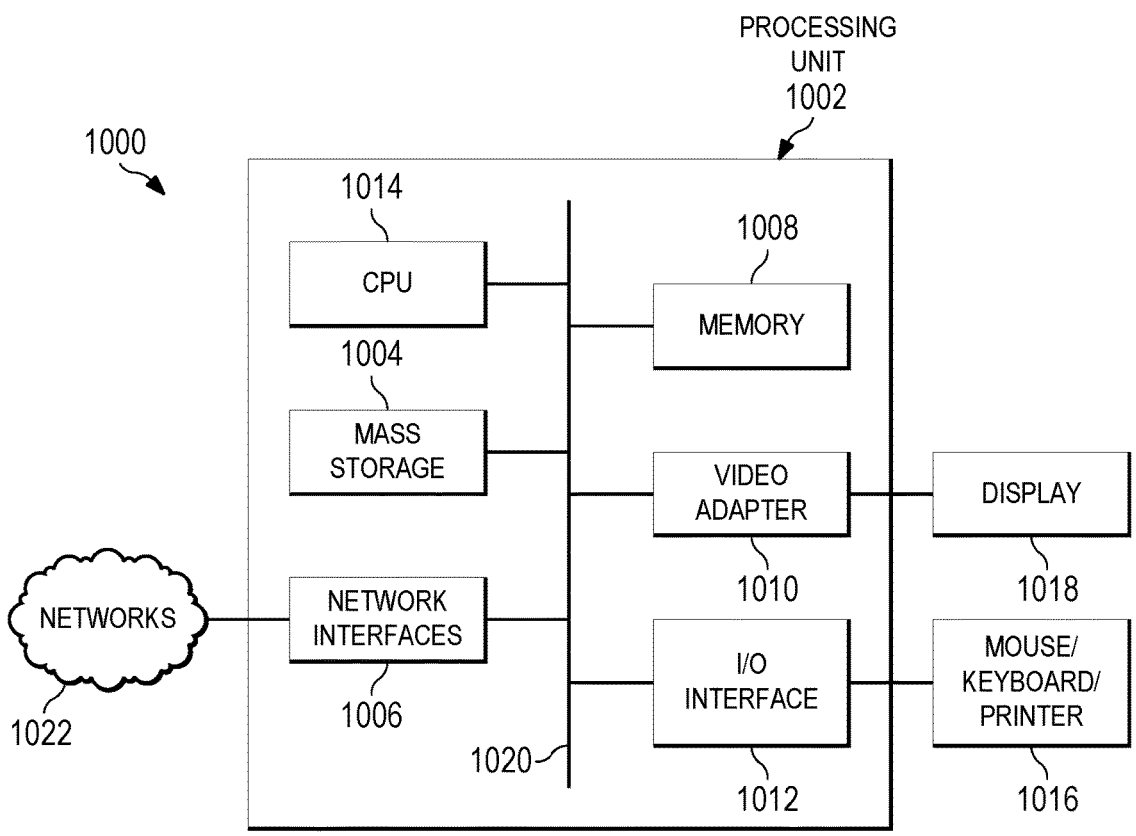
FIG. 10 is a block diagram illustrating an example computing system that may be used for implementing embodiments disclosed herein.

FIGS. 8 and 9 are general, high-level block diagrams of apparatus that could be implemented at a UE and network equipment, respectively. FIG. 10 is a block diagram illustrating an example computing system that may be used for implementing embodiments disclosed herein.

For example, the computing system 1000 can be any entity of UE, AN, MM, SM, UPGW, AS, or other network or user entity. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1000 includes a processing unit 1002. The processing unit includes a central processing unit (CPU) 1014, memory 1008, and may further include a mass storage device 1004, a video adapter 1010, and an I/O interface 1012 connected to a bus 1020.

The bus 1020 may be one or more of any type of several bus architectures including a memory bus or memory controller, a peripheral bus, or a video bus. The CPU 1014 may comprise any type of electronic data processor. The memory 1008 may comprise any type of non-transitory system memory such as static random access memory (SRAM), dynamic random access memory (DRAM), synchronous DRAM (SDRAM), read-only memory (ROM), or a combination thereof. In an embodiment, the memory 1008 may include ROM for use at boot-up, and DRAM for program and data storage for use while executing programs.

The mass storage 1004 may comprise any type of non-transitory storage device configured to store data, programs, and other information and to make the data, programs, and other information accessible via the bus 1020. The mass storage 1004 may comprise, for example, one or more of a solid state drive, hard disk drive, a magnetic disk drive, or an optical disk drive.

The video adapter 1010 and the I/O interface 1012 provide interfaces to couple external input and output devices to the processing unit 1002. As illustrated, examples of input and output devices include a display 1018 coupled to the video adapter 1010 and a mouse/keyboard/printer 1016 coupled to the I/O interface 1012. Other devices may be coupled to the processing unit 1002, and additional or fewer interface cards may be utilized. For example, a serial interface such as Universal Serial Bus (USB) (not shown) may be used to provide an interface for an external device.

The processing unit 1002 also includes one or more network interfaces 1006, which may comprise wired links, such as an Ethernet cable, and/or wireless links to access nodes or different networks. The network interfaces 1006 allow the processing unit 1002 to communicate with remote units via the networks. For example, the network interfaces 1006 may provide wireless communication via one or more transmitters/transmit antennas and one or more receivers/receive antennas. In an embodiment, the processing unit 1002 is coupled to a local-area network 1022 or a wide-area network for data processing and communications with remote devices, such as other processing units, the Internet, or remote storage facilities.

Figure 11:
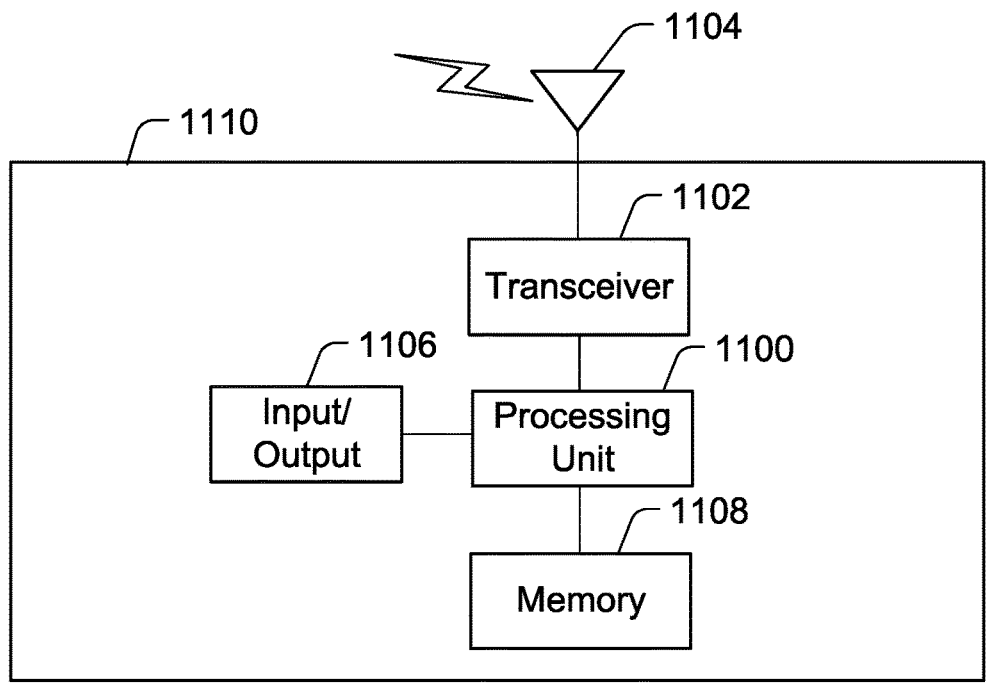
FIGS. 11 and 12 illustrate further example devices that may implement the methods and teachings according to this disclosure.
Figure 12:
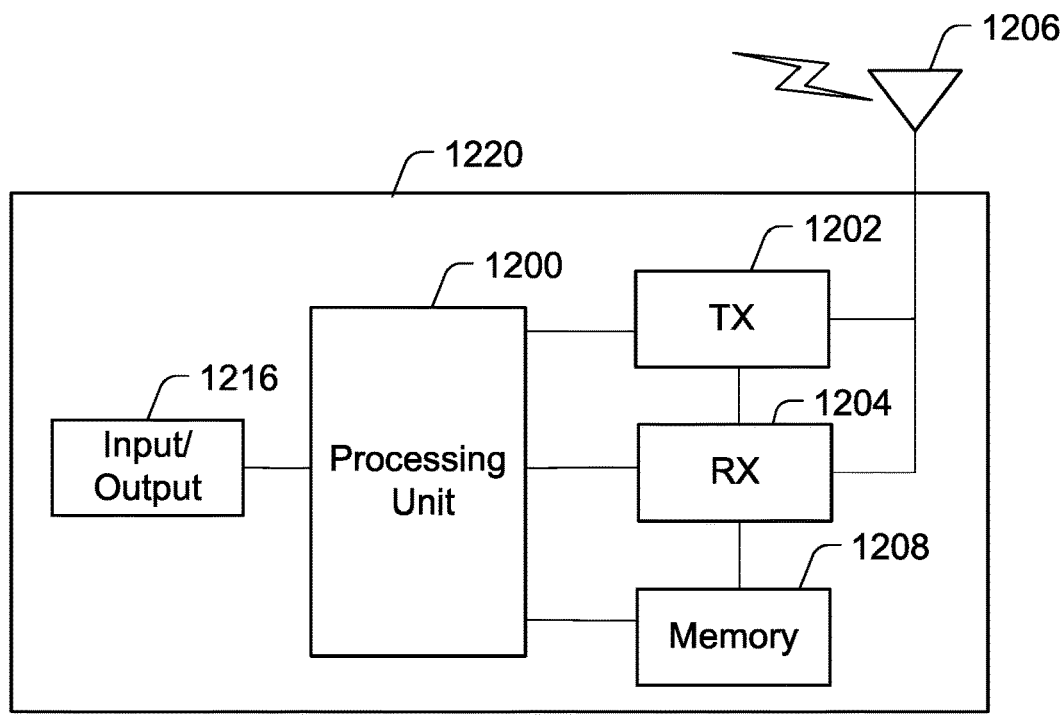

FIGS. 11 and 12 illustrate further example devices that may implement the methods and teachings according to this disclosure. In particular, FIG. 11 illustrates an example UE 1110, and FIG. 12 illustrates an example network element 1220 such as a base station. These components could be used in the communication system 100, the communication system 101, or in any other suitable system.

As shown in FIG. 11, the UE 1110 includes at least one processing unit 1100. The processing unit 1100 implements various processing operations of the UE 1110. For example, the processing unit 1100 could perform signal coding, data processing, power control, input/output processing, or any other functionality enabling the UE 1110 to operate in a communication system such as 100, 101. The processing unit 1100 may also be configured to implement some or all of the functionality and/or embodiments described in more detail herein. Each processing unit 1100 includes any suitable processing or computing device configured to perform one or more operations. Each processing unit 1100 could, for example, include a microprocessor, microcontroller, digital signal processor, field programmable gate array, or application specific integrated circuit.

The UE 1110 also includes at least one transceiver 1102. The transceiver 1102 is configured to modulate data or other content for transmission by at least one antenna or Network Interface Controller (NIC) 1104. The transceiver 1102 is also configured to demodulate data or other content received by the at least one antenna 1104. Each transceiver 1102 includes any suitable structure for generating signals for wireless or wired transmission and/or processing signals received wirelessly or by wire. Each antenna 1104 includes any suitable structure for transmitting and/or receiving wireless or wired signals. One or multiple transceivers 1102 could be used in the UE 1110. One or multiple antennas 1104 could be used in the UE 1110. Although shown as a single functional unit, a transceiver 1102 could also be implemented using at least one transmitter and at least one separate receiver.

The UE 1110 further includes one or more input/output devices 1106 or interfaces (such as a wired interface to the internet). The input/output devices 1106 permit interaction with a user or other devices in the network. Each input/output device 1106 includes any suitable structure for providing information to or receiving information from a user, such as a speaker, microphone, keypad, keyboard, display, or touch screen, including network interface communications.

In addition, the UE 1110 includes at least one memory 1108. The memory 1108 stores instructions and data used, generated, or collected by the UE 1110. For example, the memory 1108 could store software instructions or modules configured to implement some or all of the functionality and/or embodiments described above and that are executed by the processing unit(s) 1100. Each memory 1108 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 12, the base station 1220 includes at least one processing unit 1200, at least one transmitter 1202, at least one receiver 1204, one or more antennas 1206, at least one memory 1208, and one or more input/output devices or interfaces 1216. A transceiver, not shown, may be used instead of the transmitter 1202 and receiver 1204. A scheduler may be coupled to the processing unit 1200. The scheduler may be included within or operated separately from the base station 1220. The processing unit 1200 implements various processing operations of the base station 1220, such as signal coding, data processing, power control, input/output processing, or any other functionality. The processing unit 1200 can also be configured to implement some or all of the functionality and/or embodiments described in more detail above. Each processing unit 1200 includes any suitable processing or computing device configured to perform one or more operations. Each processing unit 1200 could, for example, include a microprocessor, microcontroller, digital signal processor, field programmable gate array, or application specific integrated circuit.

Each transmitter 1202 includes any suitable structure for generating signals for wireless or wired transmission to one or more UEs or other devices. Each receiver 1204 includes any suitable structure for processing signals received wirelessly or by wire from one or more UEs or other devices. Although shown as separate components, at least one transmitter 1202 and at least one receiver 1204 could be combined into a transceiver. Each antenna 1206 includes any suitable structure for transmitting and/or receiving wireless or wired signals. Although a common antenna 1206 is shown here as being coupled to both the transmitter 1202 and the receiver 1204, one or more antennas 1206 could be coupled to the transmitter(s) 1202, and one or more separate antennas 1206 could be coupled to the receiver(s) 1204. Each memory 1208 includes any suitable volatile and/or non-volatile storage and retrieval device(s) such as those described above in connection to the UE 1110. The memory 1208 stores instructions and data used, generated, or collected by the base station 1220. For example, the memory 1208 could store software instructions or modules configured to implement some or all of the functionality and/or embodiments described above and that are executed by the processing unit(s) 1200.

Each input/output device 1206 permits interaction with a user or other devices in the network. Each input/output device 1206 includes any suitable structure for providing information to or receiving/providing information from a user, including network interface communications.

Various embodiments are described in detail herein. Several features are also summarized below.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by an establishing unit/module for establishing a serving cluster, a instantiating unit/module, an establishing unit/module for establishing a session link, a maintaining unit/module, and/or other performing unit(s)/module(s) for performing operations disclosed herein. The respective units/modules may be hardware, software, or a combination thereof. For instance, one or more of the units/modules may be an integrated circuit, such as field programmable gate arrays (FPGAs) or application-specific integrated circuits (ASICs).What has been described is merely illustrative of the application of principles of embodiments of the present disclosure. Other arrangements and methods can be implemented by those skilled in the art.

The contents of the drawings are intended solely for illustrative purposes, and the present invention is in no way limited to the particular example embodiments explicitly shown in the drawings and described herein. For example, FIGS. 1A and 1B are block diagrams of example communication systems in which embodiments may be implemented. Other embodiments could be implemented in communication systems that include more network elements than shown, or that have different topologies than the example shown. Similarly, the examples in the other drawings are also intended solely for illustrative purposes.

Other implementation details could also vary between different embodiments.

In addition, although described primarily in the context of methods and systems, other implementations are also contemplated, as instructions stored on a non-transitory processor-readable medium, for example. The instructions, when executed by one or more processors, cause the one or more processors to perform a method.

Further example embodiments are also described below.

An example 1 relates to a method comprising: assigning a set of communication resources for grant-free transmission to a UE or group of UEs in a communication system; and assigning, to the UE or the UEs in the group of UEs, a set of diversity channels in the set of communication resources assigned for grant-free transmission.

An example 2 includes the method of example 1, further comprising: transmitting to each UE information from which the UE identifies its assigned set of diversity channels.

An example 3 includes the method of example 2, wherein the information from which the UE identifies its assigned set of diversity channels comprises an explicit identification of its assigned set of diversity channels or an implicit identification of its assigned set of diversity channels.

An example 4 includes the method of example 1, wherein assigning a set of diversity channels comprises assigning one or more of the same diversity channels to each of multiple UEs.

An example 5 includes the method of example 1, wherein assigning a set of diversity channels comprises assigning a respective UE-specific diversity channel to each UE.

An example 6 relates to a method comprising: selecting at a UE, from a set of communication resources in a communication system, a subset of the communication resources for a grant-free transmission by the UE; and transmitting data by grant-free transmission from the UE using the selected subset of the communication resources.

An example 7 includes the method of example 6, wherein the selecting comprises selecting based on an identifier of the UE.

An example 8 includes the method of example 6, wherein the selecting comprises selecting based on information received by the UE from network equipment in the communication system.

An example 9 includes the method of example 6, wherein the set of communication resources assigned for use by UEs in grant-free transmissions comprises N REs, and wherein the selecting comprises selecting a diversity channel f(m,N), where f is a mapping and m is a number of REs in the diversity channel.

An example 10 includes the method of example 6, wherein the set of communication resources assigned for use by UEs in grant-free transmissions comprises REs assigned to an access region that is partitioned into a plurality of partitions, and wherein the selecting comprises selecting a two-level diversity channel defined by functions f1 and f2: f1(m1,N1), where m1 is the number of partitions assigned for the diversity channel and N1 is the total number of partitions in the access region; f2(m2,N2), where m2 is the number of REs that are assigned for the UE and N2 is the total number of REs in each partition.

An example 11 includes the method of example 6, wherein the set of communication resources assigned for use by UEs in grant-free transmissions comprises REs assigned to an access region that is partitioned into a plurality of partitions, and wherein the selecting comprises defining L different diversity channels for each of the partitions and defining a hopping pattern from each partition to another partition.

An example 12 includes the method of example 6, wherein the selecting comprises selecting the subset of the communication resources from a look up table.

An example 13 includes the method of any one of examples 6 to 12, further comprising: selecting a further subset of the communication resources for a grant-free retransmission of the data; and retransmitting the data by grant-free transmission from the UE using the selected further subset of the communication resources.

An example 14 relates to a method comprising: transmitting data by grant-free transmission from a UE using a subset of communication resources in a communication system; selecting a further subset of the communication resources for a grant-free retransmission of the data; and retransmitting the data by grant-free transmission from the UE using the selected further subset of the communication resources.

An example 15 includes the method of example 14, wherein selecting a further subset of the communication resources and retransmitting the data are responsive to receipt of a negative acknowledgement from a receiver to which the data was transmitted.

An example 16 includes the method of example 14, wherein both the subset and the further subset of the communication resources are selected before the transmitting.

An example 17 includes the method of example 14, comprising the features recited in any one of examples 7 to 12, in respect of the further subset of the communication resources.

An example 18 relates to a method for uplink transmission comprising: receiving, by a network entity, a first uplink grant-free transmission from a first UE in a first diversity channel of an access region; receiving, by the network entity, a second uplink grant-free transmission from a second UE in a second diversity channel of the access region, wherein the first diversity channel and the second diversity channel comprise at least one RE and partly overlap in the access region.

An example 19 includes the method of example 18, before the receiving further comprising: assigning, by the network entity, the access region for a group of UEs at least comprising the first UE and the second UE.

An example 20 includes the method of any one of examples 18 to 19, further comprising: assigning, by the network entity, the first diversity channel for the first UE; assigning, by the network entity, the second diversity channel for the second UE.

An example 21 includes the method of any one of examples 18 to 20, wherein one RE in the first diversity channel comprises at least one RE selected for the first uplink grant-free transmission by selecting a partition from a plurality of partitions of the access region and then selecting the at least one RE from the selected partition.

An example 22 includes the method of any one of examples 18 to 21, further comprising: transmitting, by the network entity, information to the first UE, wherein the information is used to indicate the first diversity channel allocated to the first UE.

An example 23 includes the method of any one of examples 18 to 22, wherein the information comprises an explicit identification of the first diversity channel or an implicit identification of the first diversity channel.

An example 24 includes the method of any one of examples 18 to 23, wherein the access region comprises at least a first level of diversity channel partition, one RE in the first level of diversity channel partition comprises at least one second level of diversity channel partition.

An example 25 relates to a method comprising: obtaining, by a user equipment (UE), a first diversity channel of an access region, wherein the access region includes multiple diversity channels for a group of UEs, and the first diversity channel comprises at least one resource element (RE) and partly overlaps with a second diversity channel; and transmitting, by the UE, an uplink grant-free transmission in the first diversity channel without receiving grant information.

An example 26 includes the method of example 25, wherein the obtaining comprises obtaining the first diversity channel based on an identifier of the UE.

An example 27 includes the method of example 25, wherein the obtaining comprises obtaining the first diversity channel based on information received by the UE from network equipment.

An example 28 includes the method of example 25, wherein the access region comprises N Resource Elements (REs), and wherein the obtaining comprises obtaining a diversity channel f(m,N) as the first diversity channel, where f is a mapping and m is a number of REs in the diversity channel.

An example 29 includes the method of example 25, wherein the access region is partitioned into a plurality of partitions, and wherein the obtaining comprises obtaining as the first diversity channel a two-level diversity channel defined by functions f1 and f2: f1(m1,N2), where m1 is the number of partitions assigned for the diversity channel and N2 is the total number of partitions in the access region; f2(m2,N2), where m2 is the number of REs that are assigned for the UE and N2 is the total number of REs in each partition.

An example 30 includes the method of example 25, wherein the access region is partitioned into a plurality of partitions, and wherein the obtaining comprises defining the first diversity channel as L different diversity channels for each of the partitions and a hopping pattern from each partition to another partition.

An example 31 includes the method of example 25, wherein the obtaining comprises obtaining the first diversity channel from a look up table.

An example 32 includes the method of any one of examples 24 to 31, further comprising: obtaining a further diversity channel; and transmitting, by the UE, an uplink grant-free retransmission in the further diversity channel without receiving grant information.

An example 33 includes the method of any one of examples 24 to 32, wherein the access region comprises at least a first level of diversity channel partition, one RE in the first level of diversity channel partition comprises at least one second level of diversity channel partition.

An example 34 relates to a method comprising: transmitting, by a user equipment (UE), an uplink grant-free transmission in a first diversity channel of an access region without receiving grant information, wherein the access region includes multiple diversity channels for a group of UEs, and the first diversity channel comprises at least one resource element (RE) and partly overlaps with a second diversity channel; obtaining a further diversity channel; and transmitting, by the UE, an uplink grant-free retransmission in the further diversity channel without receiving grant information.

An example 35 includes the method of example 34, wherein the obtaining and transmitting the uplink grant-free retransmission are responsive to receipt of a negative acknowledgement from a receiver to which the grant-free transmission was transmitted.

An example 36 includes the method of example 34, wherein both the first diversity channel and the further diversity channel are obtained before transmitting the uplink grant-free transmission.

An example 37 includes the method of example 34, comprising the features recited in any one of examples 25 to 32, in respect of the further diversity channel.

An example 38 relates to a non-transitory processor-readable medium storing instructions which, when executed by one or more processors, cause the one or more processors to perform a method according to any one or more of examples 1 to 37.

An example 39 relates to an apparatus comprising: a transmitter; and a resource manager, operatively coupled to the transmitter, to assign a set of communication resources for grant-free transmission to a UE or group of UEs in a communication system, and assign, to the UE or the UEs in the group of UEs, a set of diversity channels in the set of communication resources assigned for grant-free transmission.

An example 40 includes the apparatus of example 39, wherein the resource manager is configured to implement the features of any one of examples 2 to 5.

An example 41 relates to a UE comprising: a resource manager to select, from a set of communication resources in a communication system, a subset of the communication resources for a grant-free transmission by the UE; and a transmitter, operatively coupled to the resource manager, to transmit data by grant-free transmission from the UE using the selected subset of the communication resources.

An example 42 includes the UE of example 41, wherein one or more of the resource manager, the transmitter, and a receiver coupled to the resource manager, is configured to implement the features of any one of examples 7 to 17.

An example 43 relates to an apparatus comprising: a receiver to receive, at a network entity, a first uplink grant-free transmission from a first user equipment (UE) in a first diversity channel of an access region, and a second uplink grant-free transmission from a second UE in a second diversity channel of the access region, wherein the first diversity channel and the second diversity channel comprise at least one resource element (RE) and partly overlap in the access region.

An example 44 includes the apparatus of example 43, configured to implement the features of any one of examples 19 to 24.

An example 45 relates to a UE comprising: a resource manager to obtain a first diversity channel of an access region, wherein the access region includes multiple diversity channels for a group of UEs, and the first diversity channel comprises at least one resource element (RE) and partly overlaps with a second diversity channel; and a transmitter, operatively coupled to the resource manager, to transmit an uplink grant-free transmission in the first diversity channel without receiving grant information.

An example 46 includes the UE of example 45, wherein one or more of the resource manager, the transmitter, and a receiver coupled to the resource manager, is configured to implement the features of any one of examples 26 to 33.

In some embodiments, a set of communication resources for grant-free transmission is assigned to a UE or group of UEs in a communication system. A set of diversity channels in the assigned set of communication resources is assigned to the UE or the UEs in the group of UEs. At a UE, a subset of the communication resources (a diversity channel) is selected for a grant-free transmission by the UE, and data is transmitted by grant-free transmission from the UE using the selected subset of the communication resources. Diversity channel/communication resource subset assignment or selection may or may not be UE-specific. Diversity channels/communication resource subsets could also be assigned or selected for retransmission of data.

We claim:

1. A method for uplink data transmission comprising:
   obtaining, by a user equipment (UE), at least one diversity channel for uplink grant free data transmission, the at least one diversity channel comprising uplink grant free transmission resources assigned to the UE, the uplink grant free transmission resources specified by the diversity channel in one or more positions corresponding to partitions of an access region and one or more positions corresponding to resource elements (REs) in each of the partitions of the access region;

transmitting, by the UE, an uplink initial data transmission and a subsequent transmission in the at least one diversity channel without receiving grant information from a network equipment.

2. The method of claim 1, wherein the REs assigned to the UE within the access region are non-contiguous.

3. The method of claim 1, further comprising:
receiving, by the UE, signalling to indicate the at least one diversity channel, wherein the signalling comprises at least one index having a predefined relationship with the at least one diversity channel.

4. The method of claim 1, wherein the at least one diversity channel is associated with an identification of the UE, and the UE obtains the at least one diversity channel from a look up table based on the identification of the UE.

5. The method of claim 1, wherein the at least one diversity channel is a two-level diversity channel defined by functions f1 and f2:
f1(m1,N1), where m1 is the number of partitions assigned for the diversity channel and N1 is the total number of partitions in the access region;
f2(m2,N2), where m2 is the number of REs that are assigned for the UE and N2 is the total number of REs in each partition.

6. The method of claim 1, further comprising:
transmitting, by the UE, the subsequent transmission in the at least one diversity channel after the UE receives a negative acknowledgement (NACK) from the network equipment or based on an acknowledgement (ACK)/NACK less scheme.

7. A method for uplink data transmission comprising:
receiving, by a network equipment, an uplink initial data transmission and a subsequent transmission from a first user equipment (UE) in a first diversity channel without transmitting grant information to the first UE;
wherein the first diversity channel comprises uplink grant free transmission resources assigned to the first UE, the uplink grant free transmission resources specified by the first diversity channel in one or more positions corresponding to partitions of an access region and one or more positions corresponding to resource elements (REs) in each of the partitions of the access region.

8. The method of claim 7, further comprising:
receiving, by the network equipment, an uplink initial data transmission and a subsequent transmission from a second UE in a second diversity channel without transmitting grant information to the second UE;
wherein the first diversity channel comprises at least one RE partly overlapping with the second diversity channel.

9. The method of claim 7, further comprising
transmitting, by the network equipment, signalling to indicate the first diversity channel, wherein the signalling comprises at least one index having a predefined relationship with the first diversity channel.

10. The method of claim 7, wherein the first diversity channel is associated with an identification of the first UE, and the identification of the first UE has a predefined relationship with the first diversity channel.

11. The method of claim 7, wherein the first diversity channel is a two-level diversity channel defined by functions f1 and f2:
f1(m1,N1), where m1 is the number of partitions assigned for the diversity channel and N1 is the total number of partitions in the access region;
f2(m2,N2), where m2 is the number of REs that are assigned for the UE and N2 is the total number of REs in each partition.

12. A User Equipment (UE) comprising:
a processor configured to obtain at least one diversity channel for uplink grant free data transmission, the at least one diversity channel comprising uplink grant free transmission resources assigned to the UE, the uplink grant free transmission resources specified by the diversity channel in one or more positions corresponding to partitions of an access region and one or more positions corresponding to resource elements (REs) in each of the partitions of the access region; and
a transmitter, operatively coupled to the processor, to transmit an uplink initial data transmission and a subsequent transmission in the at least one diversity channel without receiving grant information from a network.

13. The UE of claim 12, wherein the REs assigned to the UE within the access region are non-contiguous.

14. The UE of claim 12, further comprising:
a receiver, coupled to the processor, to receive signalling to indicate the at least one diversity channel, wherein the signalling comprises at least one index having a predefined relationship with the at least one diversity channel.

15. The UE of claim 12, further comprising:
a memory, coupled to the processor, to store a look up table in which the at least one diversity channel is associated with an identification of the UE,
wherein the processor is configured to obtain the at least one diversity channel from the look up table based on the identification of the UE.

16. The UE of claim 12, wherein the at least one diversity channel is a two-level diversity channel defined by functions f1 and f2:
f1(m1,N1), where m1 is the number of partitions assigned for the diversity channel and N1 is the total number of partitions in the access region;
f2(m2,N2), where m2 is the number of REs that are assigned for the UE and N2 is the total number of REs in each partition.

17. A network equipment comprising:
a transmitter;
a receiver to receive an uplink initial data transmission and a subsequent transmission from a first user equipment (UE) in a first diversity channel without transmitting grant information to the first UE,
wherein the first diversity channel comprises uplink grant free transmission resources assigned to the first UE, the uplink grant free transmission resources specified by the first diversity channel in one or more positions corresponding to partitions of an access region and one or more positions corresponding to resource elements (REs) in each of the partitions of the access region.

18. The network equipment of claim 17,
wherein the receiver is further configured to receive an uplink initial data transmission and a subsequent transmission from a second UE in a second diversity channel without transmitting grant information to the second UE, wherein the first diversity channel comprises at least one RE partly overlapping with the second diversity channel.

19. The network equipment of claim 17, wherein the transmitter is configured to transmit signalling to indicate the first diversity channel, wherein the signalling comprises at least one index having a predefined relationship with the first diversity channel.

20. The network equipment of claim 17, wherein the first diversity channel is associated with an identification of the first UE, and the identification of the first UE has a predefined relationship with the first diversity channel.

21. The network equipment of claim 17, wherein the first diversity channel is a two-level diversity channel defined by functions f1 and f2:
- f1(m1,N1), where ml is the number of partitions assigned for the diversity channel and N1 is the total number of partitions in the access region;
- f2(m2,N2), where m2 is the number of REs that are assigned for the UE and N2 is the total number of REs in each partition.

* * * * *